(12) United States Patent
Urban

(10) Patent No.: US 12,542,558 B2
(45) Date of Patent: Feb. 3, 2026

(54) MACHINE LEARNING-ENABLED ANALOG-TO-DIGITAL CONVERTER

(71) Applicant: Magnolia Electronics Inc., Los Angeles, CA (US)

(72) Inventor: Luke Urban, Los Angeles, CA (US)

(73) Assignee: Magnolia Electronics Inc., Los Angeles, CA (US)

( * ) Notice: Subject to any disclaimer, the term of this patent is extended or adjusted under 35 U.S.C. 154(b) by 0 days.

(21) Appl. No.: 18/238,421

(22) Filed: Aug. 25, 2023

(65) Prior Publication Data

US 2024/0171189 A1     May 23, 2024

Related U.S. Application Data

(60) Provisional application No. 63/425,949, filed on Nov. 16, 2022, provisional application No. 63/425,965, filed on Nov. 16, 2022.

(51) Int. Cl.
*H03M 1/06* (2006.01)
*H03M 1/10* (2006.01)
(Continued)

(52) U.S. Cl.
CPC ........... *H03M 1/0604* (2013.01); *H03M 1/10* (2013.01); *G06F 3/041* (2013.01); *G06F 3/045* (2013.01)

(58) Field of Classification Search
CPC ........ H03M 1/0604; H03M 1/10; H04R 3/00; H04R 3/04
See application file for complete search history.

(56) References Cited

U.S. PATENT DOCUMENTS

| 9,112,524 B2 | 8/2015 | Snelgrove |
| 10,198,532 B2 * | 2/2019 | Christian ................ G06F 17/18 |

(Continued)

FOREIGN PATENT DOCUMENTS

| EP | 3576020 A1 | 12/2019 |
| EP | 3944503 A1 | 1/2022 |
| KR | 20070094162 A | 9/2007 |

OTHER PUBLICATIONS

Snelgrove, Martin, "Wideband Sampling by Decimation in Frequency," Kapik Integration, Copyright Kapik Integration 2011; IMS2011 Baltimore, MD; 38 pages.

(Continued)

*Primary Examiner* — Joseph J Lauture
(74) *Attorney, Agent, or Firm* — Patent Capital Group

(57) ABSTRACT

A machine-learning-enabled analog-to-digital converter includes a parallel analog-to-digital converter array (PA ADC) and a machine-learning unit. The PA ADC receives an analog input signal and includes a signal routing unit and a parallel array of comparators. The signal routing unit produces a plurality of analog output channels, each based at least in part on the analog input signal. Each comparator of the parallel array of comparators produces a respective digital representation, at least in part based on the respective split output from one of the plurality of channels. The machine-learning unit includes a machine learning algorithm that produces digital output codes that represent the analog input signal, at least in part based on the respective digital representations from the parallel array of comparators.

20 Claims, 10 Drawing Sheets

(51) Int. Cl.
G06F 3/041 (2006.01)
G06F 3/045 (2006.01)

(56) References Cited

U.S. PATENT DOCUMENTS

| | | |
|---|---|---|
| 10,970,441 B1 | 4/2021 | Zhang et al. |
| 11,101,810 B1 | 8/2021 | Veldhoven |
| 2009/0154575 A1* | 6/2009 | Rofougaran ........ H04L 27/2647 |
| | | 375/260 |
| 2010/0060502 A1 | 3/2010 | Toyama et al. |
| 2013/0207822 A1 | 8/2013 | Snelgrove |
| 2015/0245135 A1* | 8/2015 | Gao ................ H04W 52/0283 |
| | | 381/123 |
| 2016/0182074 A1 | 6/2016 | Speir et al. |
| 2016/0248437 A1* | 8/2016 | Zhang ................ H03M 1/1071 |
| 2019/0028130 A1* | 1/2019 | Mansour ................ H04B 1/385 |
| 2019/0069787 A1* | 3/2019 | Lee ...................... A61B 5/0031 |
| 2019/0319633 A1 | 10/2019 | Zou et al. |
| 2019/0319634 A1 | 10/2019 | Zou et al. |
| 2022/0019883 A1 | 1/2022 | Veldhoven |

OTHER PUBLICATIONS

Feb. 28, 2024 International Search Report and Written Opinion from International Application No. PCT/US2023/037257; 7 pgs.
Mar. 11, 2024 International Search Report from International Application No. PCT/US2023/037263; 3 pgs.

* cited by examiner

MACHINE LEARNING-ENABLED ANALOG-TO-DIGITAL CONVERTER

CROSS-REFERENCE TO RELATED APPLICATIONS

This application claims priority to U.S. Provisional App. Ser. No. 63/425,949, filed Nov. 16, 2022, entitled "Parallel Spectral Sampler," and U.S. Provisional App. Ser. No. 63/425,965, filed Nov. 16, 2022, entitled "Machine Learning Enabled ADC." This application is related to U.S. application Ser. No. 18/238,430, entitled "MACHINE LEARNING-ENABLED ANALOG-TO-DIGITAL CONVERTER," filed the same day as this application on Aug. 25, 2023 (issued as U.S. Pat. No. 12,301,243 on May 13, 2025). The entire contents of all three applications are herein incorporated by reference in their entirety.

BACKGROUND

Technical Field

This disclosure relates to calibration and testing of analog-to-digital conversion and, in particular, to a sampling arrangement including machine learning.

Related Art

Analog-to-digital conversion is the backbone of modern electronics. At its core, an analog-to-digital converter (ADC) includes analog circuitry and digital comparators. The binary result of these comparators informs a user about an analog signal fed into the ADC device.

This analog-to-digital process occurs when a digital system interacts with the real world. The Shannon-Nyquist sampling theory states that all of the information contained in a frequency-bounded analog signal can be captured through a discrete set of instantaneous measurements. The only requirement is that these instantaneous measurements are recorded at a fixed sampling rate that is at least twice as fast as the highest frequency contained in the analog signal. From this mathematical underpinning, a family of designs for ADCs have been developed. These systems include delicate circuitry designed to capture a sequence of instantaneous measurements of the analog input in the time domain. From this basic principle, each architecture has different trade-offs with regards to key performance characteristics, such as power, speed, resolution, chip footprint area, and latency.

Researchers have experimented with alternative methods for solving the analog-to-digital conversion problem. For example, the field of sub-Nyquist sampling (such as compressed sensing) shows that if the input analog signal is known to contain consistent patterns, then the number of samples required to capture all information contained in the analog input is less than what Shannon-Nyquist requires.

Another approach attempts to solve the analog-to-digital conversion problem by applying a bank of mixer circuits to measure Walsh codes of the analog input.

However, these approaches often require idealized analog circuitry connected to a rigid digital interface to calibrate and reconstitute the original Shannon-Nyquist representation. This circuitry is often impractical, if not impossible, to build (such as ideal bandpass filters). As a result, these technologies have failed to be widely commercially adopted.

In the approaches described so far, the analog-to-digital conversion problem is solved by deriving a set of mathematical equations, and then designing and testing a set of circuitry to implement those equations. Any deviation from the ideal mathematics in the implemented circuitry must be studied and accounted for. As a result, every step along the process is well understood, and every component in the system is modeled and characterized.

Analog circuitry has complex and nonlinear behavior. Engineers can only build systems out of parts they understand, so the usage of analog circuits is constrained into domains simple enough to model. Thus, the equations that can be implemented are limited by the components the engineer understands. Furthermore, these systems can only be operated under conditions or environments that have been exhaustively modeled.

BRIEF SUMMARY

In a first implementation, a machine-learning-enabled analog-to-digital converter includes a parallel analog-to-digital converter array (PA ADC) that receives an analog input signal and including a signal routing unit that produces a plurality of analog channels, each analog channel of the plurality of analog channels based at least in part on the analog input signal; and a parallel array of comparators, each comparator of the parallel array of comparators to produce a respective digital representation, at least in part based on the respective analog channel from one of the plurality of channels; and a machine-learning unit including a machine learning algorithm configured to produce digital output codes that represent the analog input signal, at least in part based on the respective digital representations from the parallel array of comparators.

A second implementation is the first implementation, wherein the parallel array of comparators includes a plurality of bandpass filter circuits, each bandpass filter circuit of the plurality of bandpass filtered circuits configured to produce a filtered signal, at least in part by passing a portion of the analog channel in a frequency band centered on a predetermined frequency for the respective channel, the digital representation of the analog input signal is produced, at least in part based on the respective filtered signal, and the plurality of bandpass filter circuits includes at least one of a low pass filter or a high pass filter.

A third implementation is any of the first or second implementations, wherein the signal routing unit includes a layered tree structure of buffer-and-split circuits, in which each of the buffer-and-split circuits produces an output, the respective output at least in part based on the analog input signal, and each of the buffer-and-split circuits buffers the respective output.

A fourth implementation is any of the first through third implementations, wherein the comparators are one-bit analog-to-digital converters (ADCs) configured to produce the respective digital representation, at least in part based on a comparison of the respective analog channel against a predetermined reference voltage at a trigger time.

A fifth implementation is any of the first through fourth implementations, wherein the parallel array of comparators includes a plurality of high-pass filter circuits (HPFCs), each HPFC of the HPFCs including a respective high-pass filter of order K, where K is a positive integer specific to the respective channel, the respective high-pass filter to produce a filtered signal, at least in part based on the respective analog channel, and the digital representation of the analog input signal is produced, at least in part based on the respective filtered signal.

A sixth implementation is any of the first through fifth implementations, wherein the parallel array includes a first spectral sampling circuit (SSC) and a second SSC, the second SSC $\pi/2$ out of phase with the first SSC, each SSC comprising a waveform generator that produces a local waveform, a multiplier that multiplies the respective analog channel against the local waveform to produce a product, and an integrating unit that integrates the product over a time interval to produce an integrated analog output; and a plurality of quantizers, each quantizer of the plurality of quantizers configured to convert the respective integrated analog output into the digital representation of the analog input signal.

A seventh implementation is any of the first through sixth implementations, wherein the machine-learning unit limits an error between the digital output codes and expected Shannon-Nyquist samples of the analog input signal to within a bit-resolution or code error rate of the machine-learning-enabled analog-to-digital converter.

In an eighth implementation, a method is to be implemented by a machine-learning-enabled analog-to-digital converter and includes receiving an analog input signal at a parallel analog-to-digital converter array (PA ADC); generating, with a signal routing unit, a plurality of analog channels, each analog channel of the plurality of analog channels based at least in part on the analog input signal; producing, with a respective comparator of a parallel array of comparators, a respective digital representation, at least in part based on a respective channel of the plurality of channels; and producing digital output codes that represent the analog input signal, at least in part based on the respective digital representations from the parallel array of comparators.

A ninth implementation is the eighth implementation, further comprising: producing, by each bandpass filter circuit of a plurality of bandpass filter circuits, a filtered signal, at least in part by passing a portion of the analog channel in a frequency band centered on a predetermined frequency for a respective analog channel, wherein the digital representation of the analog input signal is produced, at least in part based on the respective filtered signal, and the plurality of bandpass filter circuits includes at least one of a low pass filter or a high pass filter.

A tenth implementation is any of the eighth or ninth implementations, further comprising: producing, by each buffer-and-split circuit of a layered tree structure of buffer-and-split circuits, an output, at least in part based on the analog input signal, wherein each of the buffer-and-split circuits buffers the respective output.

An eleventh implementation is any of the eighth through tenth implementations, wherein the comparators are one-bit analog-to-digital converters (ADCs), and the respective digital representation is produced, at least in part based on a comparison of the respective analog channel against a predetermined reference voltage at a trigger time.

A twelfth implementation is any of the eighth through eleventh implementations, further comprising: producing a filtered signal by a respective high-pass filter of a plurality of high-pass filter circuits (HPFCs), at least in part based on the respective analog channel, each HPFC of the HPFCs including a respective high-pass filter of order K, where K is a positive integer specific to the respective channel, wherein the digital representation of the analog input signal is produced, at least in part based on the respective filtered signal.

A thirteenth implementation is any of the first through twelfth implementations, further comprising: producing a local waveform by a waveform generator of a first spectral sampling circuit (SSC) and a waveform generator of a second SSC, the second SSC $\pi/2$ out of phase with the first SSC, multiplying, by a multiplier of the first SSC and a multiplier of the second SSC, the respective analog channel against the respective local waveform to produce a product; integrating, by an integrating unit of the first SSC and an integrating unit of the second SSC, the respective product over a time interval to produce an integrated analog output; and converting, by a plurality of quantizers, the respective integrated analog output into the digital representation of the analog input signal.

A fourteenth implementation is any of the eighth through thirteenth implementations, further comprising: limiting an error between the digital output codes and expected Shannon-Nyquist samples of the analog input signal to within a bit-resolution or code error rate of the machine-learning-enabled analog-to-digital converter.

In a fifteenth implementation, a machine-learning-enabled analog-to-digital converter, includes signal-routing means for producing a plurality of analog channels, each analog channel of the plurality of analog channels based at least in part on an analog input signal; digital-representation-production means for producing a respective digital representation, at least in part based on the respective analog channel from one of the plurality of channels; and digital-output-production means for producing digital output codes that represent the analog input signal, at least in part based on the respective digital representations.

A sixteenth implementation is the fifteenth implementation, wherein the digital-representation-production means includes means for producing a filtered signal, at least in part by passing a portion of the analog channel in a frequency band centered on a predetermined frequency for the respective channel, and the digital representation of the analog input signal is produced, at least in part based on the respective filtered signal.

A seventeenth implementation is any of the fifteenth or sixteenth implementations, wherein the signal-routing means includes buffering means for producing an output, at least in part based on the analog input signal, and the buffering means buffers the output.

An eighteenth implementation is any of the fifteenth through seventeenth implementations, wherein the digital-representation-production means produce the respective digital representation, at least in part based on a comparison of the respective analog channel against a predetermined reference voltage at a trigger time.

A nineteenth implementation is any of the fifteenth through eighteenth implementations, wherein the digital-representation-production means produces a filtered signal, at least in part based on the respective analog channel, and the digital representation of the analog input signal is produced, at least in part based on the respective filtered signal.

A twentieth implementation is any of the fifteenth through nineteenth implementations, further comprising: first and second spectral-sampling means for producing a local waveform, for multiplying the respective analog channel against the local waveform to produce a product, and for integrating the product over a time interval to produce an integrated analog output, the second spectral-sampling means $\pi/2$ out of phase with the first spectral-sampling means; and quantization means for converting the respective integrated analog output into the digital representation of the analog input signal.

A twenty-first implementation is any of the fifteenth through twentieth implementations, wherein the digital-output-production means limits an error between the digital output codes and expected Shannon-Nyquist samples of the analog input signal to within a bit-resolution or code error rate of the machine-learning-enabled analog-to-digital converter.

DETAILED DESCRIPTION

Figure 1:
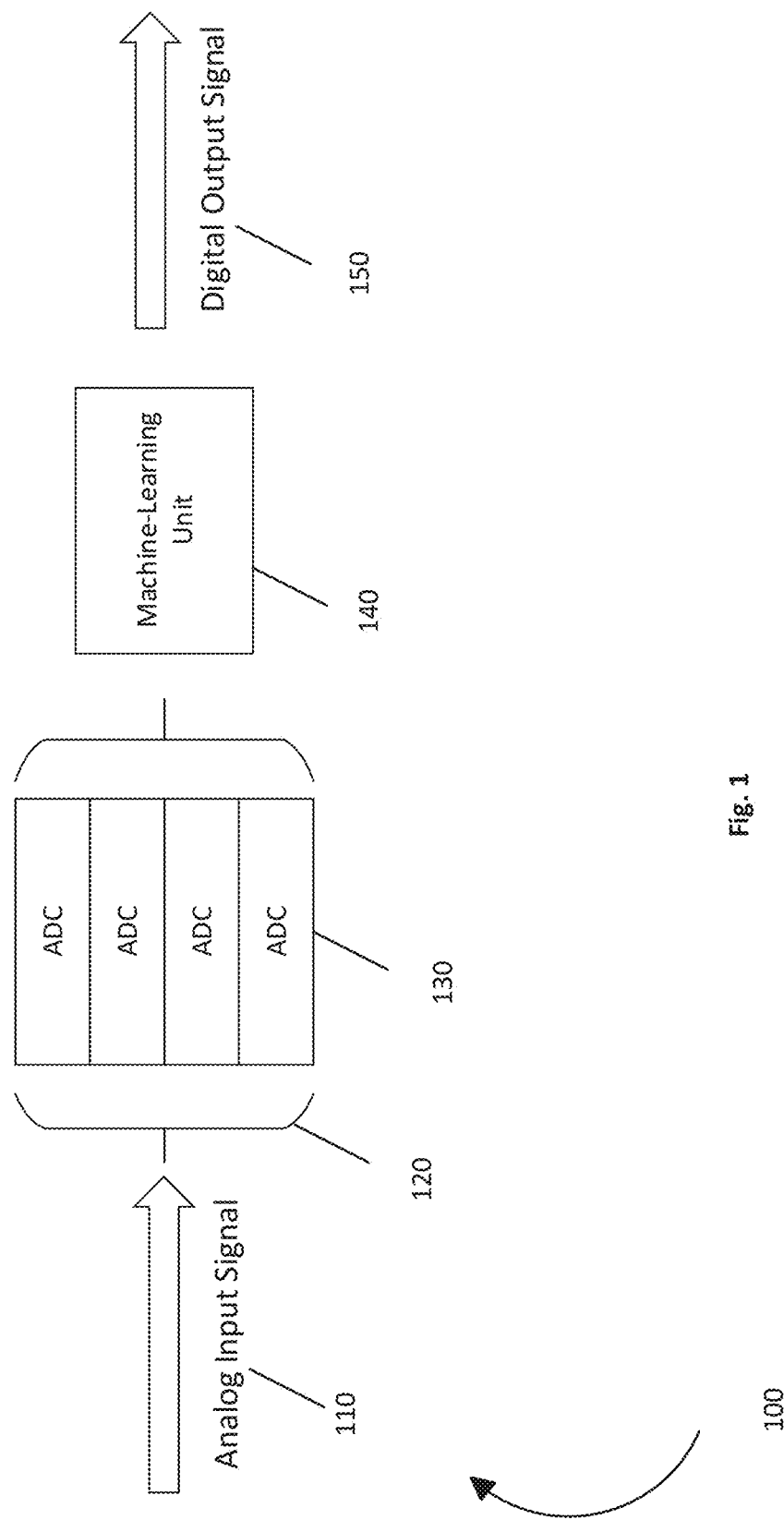
FIG. 1 illustrates a conceptual example of a machine-learning-enabled ADC, according to an implementation of the present disclosure.

FIG. 1 illustrates a conceptual example of a machine-learning-enabled ADC 100, according to an implementation of the present disclosure. The machine-learning-enabled ADC 100 receives an analog input signal 110 and outputs a digital output signal 150.

The machine-learning-enabled ADC 100 includes a signal routing unit 120, a front-end parallel array of ADC circuits 130, and a machine-learning unit 140.

The signal routing unit (SRU) 120 receives the analog input signal 110 and can produce a plurality of output analog channels, each based at least in part on the analog input signal 110. The SRU 120 can include a layered tree structure of buffer-and-split circuits (BSC), discussed later. Each BSC can amplify the analog input to produce an output routed to a number of downstream elements. The number of layers and number of splits at each layer of the tree structure can be based on the resulting impedance and power consumption of the SRU 120.

In one configuration, the signal bandwidth of each BSC can match the signal bandwidth of the analog input, such that each analog signal in the plurality of output channels is a replica of the analog input. In a configuration with bandpass filters, discussed below, the signal bandwidth of each BSC can be restricted to split the analog input signal in a portion of its frequency spectrum. These bandpass BSCs are configured such that each analog signal in the plurality of channels contains the information for its respective ADC circuit.

The parallel array of ADC circuits 130 receives the respective split outputs from the signal routing unit 120. Each of the ADC circuits 130 maps a respective split output to a digital output. In many implementations, the ADC circuits 130 are or include a comparator that compares the respective split output against a predetermined threshold. The number of such ADC circuits is a positive integer, N. The digital outputs form a collection of features in a high-dimensional format. The parallel array of ADC circuits 130 can be constructed from circuit elements, such as resistors, capacitors, and transistors, etc.

The machine-learning unit 140 receives the digital outputs from the ADC circuits 130. The machine-learning unit 140 recombines the collection of features and produces a digital output signal 150, which is a digital representation of the original analog input signal 110.

That is, the machine-learning unit 140 can convert the high-dimensional digital feature set into an equivalent of Shannon-Nyquist samples of the analog input signal. The resulting digital measurements from the machine-learning unit 140 then can be transmitted as the output of the overall machine-learning-enabled ADC 100.

In many implementations, the parallel array of ADC circuits 130 and the machine-learning unit 140 can be directly wired together. In other implementations, the unprocessed, raw output of the parallel array of ADC circuits 130 can be transmitted through an intermediary channel or path, and the machine-learning unit 140 is remote. This intermediary transmission can involve a data storage system, such that the machine-learning unit 140 processes the output of the parallel array asynchronously. The digital output of the machine-learning unit 140 then can be transmitted as the output of the overall ADC 100.

The present disclosure does not require there to be any structure or pattern inherent in the analog input signal. The machine learning algorithm does not rely on assumptions about the content of the signal to complement the data observed by the ADCs.

This characteristic differentiates the present disclosure from techniques that utilize sub-Nyquist sampling, such as compressed sensing. Sub-Nyquist techniques assume that signals will occupy only a subset of the signal bandwidth. In other words, they assume that a signal is sparse. This assumption of sparsity allows them to infer the true analog signal content using a sampling rate below that suggested by the Shannon-Nyquist theorem. For example, if it were known that a given signal is not carrying useful information at a certain set of frequencies, then those frequencies need not be measured in order to capture the useful information of the signal.

The practical utility of sub-Nyquist sampling is limited because not all signals meet that signal sparsity requirement. Further, the effort involved in developing a circuit solution for a particular application is considerable. In addition, any such solution is usually not transferable to other signals, even closely related ones.

However, certain domains of signals do have structure or patterns. For example, electrocardiograms have an inherent periodicity. Additionally, many packetized information exchange protocols have header or footer blocks that are sent before or after, respectively, the packet's payload. If there is structure in a signal, then some implementations of the circuit in the present disclosure can detect and exploit that structure to optimize device operation.

One could imagine an ADC device where a stream of data is fed in, and a machine-learning unit learns that there is a consistent pattern such that sufficient information about a signal can be observed merely by capturing P out of every Q samples per second, where Q is the number of samples per second indicated by the Shannon-Nyquist theorem, and P is some positive integer less than Q. To save power, the machine learning unit could take P samples, then power down itself, or power down the parallel array, or both, for a period of time.

Alternatively, the machine learning unit could listen for the start of a pattern, then shut down for a period of time related to that pattern. As another alternative, there could be a correlation between different frequency ranges in a signal, such that by sampling one range, the ADC device can power down the parts of the parallel array corresponding to the correlated frequency range, and infer their values from the sampled range.

In implementations of the present disclosure, the analog signal for calibration can be random and wideband within a designed voltage and frequency range.

This analog calibration signal can be created using a random number generator that produces an array of pseudo-random numbers following a uniform distribution between zero and one. Values from these numbers can then be offset and scaled to match the voltage range of an expected input signal. To convert this array of random numbers into a time series, a time-step is then defined based on the designed sample-rate of the ADC device. So, a 1 gigasample per second ADC can have a timestep of 1/(1 GHz)=1 ns, and a 100 megasample per second ADC can have a timestep of 1/(100 MHz)=10 ns. From there, the analog signal can be simulated numerically using sinc interpolation for converting a discrete-time signal into a continuous time signal. As an alternative, the analog signal can be created electronically using an arbitrary waveform generator or a digital-to-analog (DAC) device.

There may be cases where the input signal has some known structure (such as following a gaussian distribution, or following 1/f noise). In these cases, the calibration process can be customized, such as by using pseudo-random numbers from a normal distribution (not a uniform distribution), etc. Specific noise sources might be expected, such as powerline noise from the electrical grid (60 Hz USA, 50 Hz Europe). This noise can be incorporated by adding a sine-wave of the particular frequency at random amplitudes, offsets, and phases.

A signal, such as I/Q data that includes amplitude-modulating two 90-degree-out-of-phase sine waves and summing the result, might be expected. In this case, the amplitude modulation can be randomized using a random number generator (RNG), and the results multiplied by the sine-waves at a predetermined frequency.

The machine-learning unit can be constructed from standard circuit elements or implemented in software on a general-purpose processor.

The ADC device can incorporate high-dimensional input signals and generate high-dimensional output signals.

The use of machine-learning enhances the machine-learning unit's ability to handle input signals containing particular patterns or characteristics.

Because the machine-learning unit can adjust, the device can tolerate the failure or impairment of one or more subsampling elements.

The ADC device can be adjusted by adjusting the parameters of the machine-learning unit to perform better on a given set of test cases, sometimes called a test bench. For example, the machine-learning unit in devices targeted to a particular jurisdiction can be configured to resist harmful electromagnetic interference tested by that jurisdiction's regulator or detect signals specific to that jurisdiction's environment. In other words, the machine learning parameters can be used to tune the device to a given commonly-regulated market.

Traditional ADC approaches require rigid analytical designs, where the results of each digital comparator are fully understood and modeled by the engineer. The present approach breaks from this design philosophy and applies machine learning instead. In various implementations of the present disclosure, the mapping between each digital comparator and the resulting digital measurement is not necessarily known. Instead, the mapping is inferred through observation by the machine-learning unit.

The machine-learning unit allows for the parallel array to be built of parts that are easy to manufacture, but have complex or nonlinear characteristics. On top of the complex behavior of analog circuitry, a physical device produced through manufacturing will never exactly match the idealized circuits designed by engineers, and these differences become apparent when the device is pushed to the extremes (via speed, power, node size, or environment). As a result, engineers design conservatively, ensuring their devices typically are not pushed outside of a safe operating regime.

Instead of having a perfect analytical model of the analog circuitry, the machine-learning unit can learn the behavior of the manufactured device. As a result, the manufactured ADC device can be pushed outside of its "safe" operating regime, and engineers can make more flexible and radical design choices.

In operation, the output of the parallel array is polled for features, and the machine-learning unit converts the features into a finite sequence of digital values. This sequence of digital values then can be transmitted simultaneously or sequentially as the output of the overall machine-learning enabled ADC 100.

This mapping process then can be repeated. The next sequence can be aligned in time such that the start of the new sequence begins where the previous sequence ended, or the sequences can overlap such that the start of the new sequence begins before the previous sequence ends. If the sequence overlaps, then the values in the new sequence supersede the values in the older sequence. This timing allows the overall device to transmit an uninterrupted stream of data downstream. The size of these sequences can be based on the elements in the parallel array and configuration of the machine-learning unit.

Polling the parallel array and executing the machine-learning unit can introduce overall system latency, measured as the time between the analog input signal and the digital value being reported. Size and complexity of the machine-learning stage in the machine-learning-enabled ADC 100 can be restricted to minimize latency for real-time sensing applications, such as power management or industrial control systems. These size and complexity restrictions can be relaxed for asynchronous applications such as static medical imaging, geophysics, radioastronomy, or signals intelligence.

Numerical simulation of the parallel array might deviate significantly from the actual performance of a physically realized device. Examples of deviation might arise from causes such as circuitry built at untested node sizes, circuits operated at unexpected voltages or speeds, or the device being placed in an untested environment. To account for this complexity, a test device can be manufactured. This test device can include only the parallel array. The machine-learning unit can be omitted because it is implemented in digital circuitry, which is expected to be more robust than the analog circuitry of the parallel array.

The test device can accept the analog calibration signal and transmit the digital output from each element in the parallel array. This testing procedure occurs by connecting the test device to an analog signal generator that outputs the calibration signals, and storing the result of the parallel array test device. The result is a high-dimensional digital signal, representing the output of each element in the parallel array, aligned in time with the expected digital representation of the calibration signal.

Multiple copies of test devices can be built and tested to account for variability in manufacturing. The datasets generated by the test device or devices are separated from the numerically simulated datasets, such that they are not pooled together during optimization.

Front-end Parallel Array
Overview

The front-end parallel array 130 includes circuit elements that each map an analog input to a digital output. The design of the elements in the array can approximate an ideal design, but do not need to achieve a perfect analytical match. Thus, the underlying circuit elements can be built out of simpler or more reliable parts. As a result, the exact transfer function of each element (e.g., comparator) that maps the analog input to the digital output might or might not be known, and can be inconsistent across each element in the array. The number of bits provided by each element must be at least one, and the number of bits provided by each element can differ across the parallel array.

The analog input to each element is related to the analog input of the overall system, but can differ across the elements. Such difference can be due to filtering effects during signal transmission on the chip, such as if the high-frequency components become attenuated by the time they reach the final element in the parallel array. Also, the difference can be due to manufacturing imperfections in the signal routing unit. The timing of when the analog input reaches each element can differ across the parallel array, to account for transmission delays to each element that are distinct across the elements but fixed for any given element. Finally, the timing of the digital measurement can differ across the parallel array. This timing can account for clock skew, which causes an element to capture a measurement before or after the other elements in the array. This timing also accounts for elements that are sampled at different sample rates, such as some elements being updated at a positive integer multiple of the clock cycle.

Parallel Array-Bandpass Filters

Figure 2:
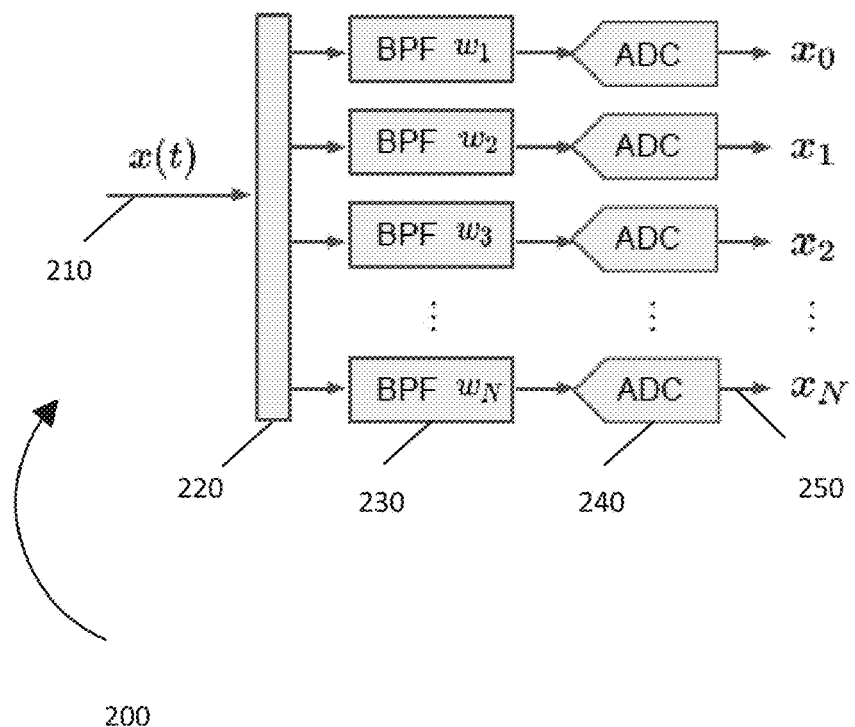
FIG. 2 illustrates an implementation in which the parallel array is configured to break up an analog signal into a collection of nonoverlapping frequency bands, according to an implementation of the present disclosure.

FIG. 2 illustrates an implementation 200 in which the parallel array 230 is configured to break up an analog signal into a collection of nonoverlapping frequency bands. The implementation 200 includes a signal routing unit 220 that receives an analog input signal 210, a plurality of filters 230, and a plurality of ADCs 240 that produce a digital output 250. In the implementation of FIG. 2, each band can be sampled in parallel at a rate much slower than the overall input signal.

In the machine learning approach, the filters 230 can be built out of simple components that actually can be manufactured. The frequency response of the filter might not be flat in the passband, and there might be phase shifts at key frequencies. The resulting filters also can have considerable roll-off, where frequencies outside of the passband will attenuate, but not disappear. One such example is cascading an RC lowpass filter with an RC highpass filter:

$$G(jw) = H_{low}(jw) + H_{high}(jw) = \frac{1}{1 + jwRC_{low}} \times \frac{jwRC_{high}}{1 + jwRC_{high}}.$$

The steepness of all roll-offs is a function of the filter order, with higher order filters having sharper roll-off characteristics. Steeper roll-offs can be achieved by cascading multiple RC bandpass filters together, with the number of filter stages contributing to the filter order of value k:

$$G^k(jw) = [H_{low}(jw) + H_{high}(jw)]^k = \left[\frac{1}{1 + jwRC_{low}} \times \frac{jwRC_{high}}{1 + jwRC_{high}}\right]^k.$$

Any filter order can be implemented, when designing a parallel array for a machine learning enabled ADC.

Here, two chained first order filters (lowpass and then highpass, or highpass and then lowpass) are considered to constitute a first order bandpass filter. In practice, a first order bandpass filter is sufficient, because the machine learning layer can correct for out-of-band signal components that pass through the filter. These filters can include minimal components, and the filters can possess a very gradual roll-off. The gradual roll-off means that information contained outside of the passband can pass through the filter, attenuated at a rate according to how far outside the passband the information is. General intuition suggests that this is acceptable, because the array is composed of multiple distinct bandpass filters.

Each bandpass filter will have an ideal frequency range and then a roll-off that overlaps with the ideal range of another filter and the roll-off range of other filters in the array.

Therefore, a preferred embodiment of the parallel array can include a collection of simple bandpass filters. In the initial configuration, the width of the passbands can be consistent across the array. The entire input signal bandwidth can be covered with passbands, so the number of elements N must be greater than or equal to the bandwidth of the input signal divided by the width of the passbands:

$$N \geq \frac{W_{max}}{B}.$$

In the minimal case, the bandpass filters can be evenly distributed across the frequency spectrum, such that one filter's high pass cutoff frequency is equal to another filter's lowpass cutoff frequency.

Variances in manufacturing may cause the cutoff frequencies of each filter to deviate, such that a gap appears between the high pass cutoff and low pass cutoff of two frequency-adjacent filters. In this case, the parallel array can be redesigned using more than the minimally required filters. This will result in an array of filters with overlapping passbands.

In the standard method, the center frequency for each bandpass will be uniformly distributed across the frequency spectrum. However, the additional bandpass filters can be biased to a certain frequency range, such as the high frequency spectrum or around some key frequency, resulting in nonuniform distribution. Each circuit element then can be coupled to an ADC product, without further anti-aliasing, for digitization at a sample rate defined by the passband width.

In other configurations, the passband width can vary across the array, for example, to exploit some desirable characteristic of filter manufacturing. Hence, the number of elements N can be chosen such that the sum of the widths of the passbands of elements from o to N is greater than or equal to the total input bandwidth.

$$\sum_{i=0}^{N} B_i \geq W_{max}.$$

Parallel Array-Taylor-Series

Figure 3:
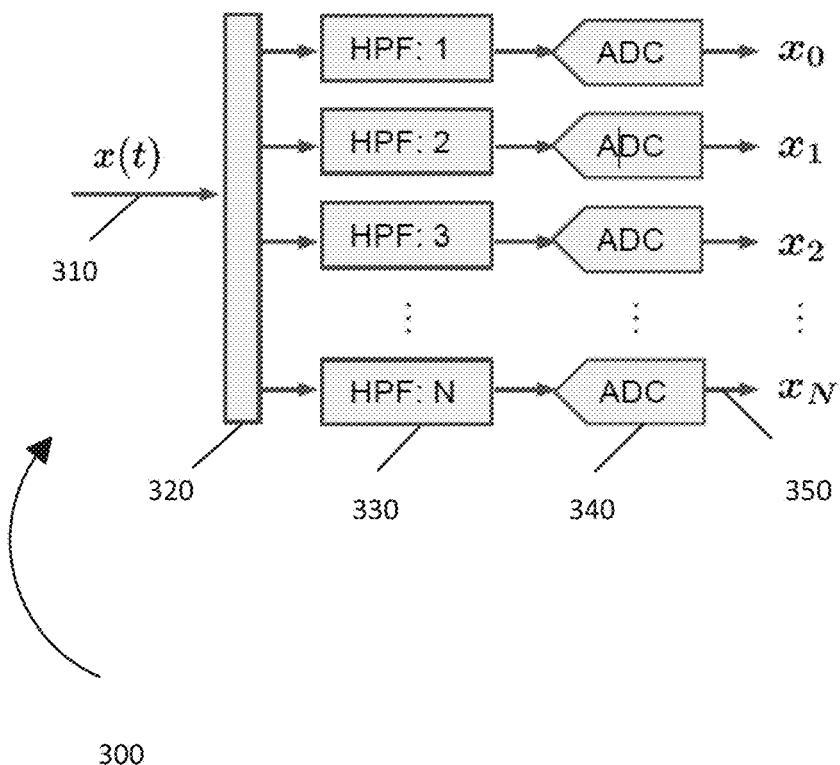
FIG. 3 illustrates another example parallel array configuration that implements a set of mathematics similar to a Taylor series approximation, according to an implementation of the present disclosure.

FIG. 3 illustrates another example parallel array configuration 300 that implements a set of mathematics similar to the Taylor series approximation, according to an implementation of the present disclosure. In general, the Taylor series states that a function can be approximated near a point, 'a', based on the function's derivatives.

$$f(x) = f(a) + f'(a)\frac{(x-a)}{1!} + f''(a)\frac{(x-a)^2}{2!} + f'''(a)\frac{(x-a)^3}{3!} + \dots$$

This approximation is performed by evaluating an increasing order of derivatives of the function at a specific point. The higher the number of calculated derivatives there are, the more accurate the approximation. In the case of analog-to-digital conversion, this approximation can be reformulated to state that an analog signal can be approximated near a sample time, 't' based on the signal's time derivatives.

$$x(t + \delta t) = x(t) + x'(t)\frac{\delta t}{1!} + x''(t)\frac{\delta t^2}{2!} + x'''(t)\frac{\delta t^3}{3!} + \dots$$

The time derivatives of an analog signal can be calculated by observing the time derivative property of the Fourier transform:

$$F\left\{\frac{d^n}{dt^n}x(t)\right\} = j\omega^n \cdot F\{x(t)\} = G^n(j\omega) \cdot F\{x(t)\}.$$

$$G^n(j\omega) = j\omega^n.$$

To implement a Taylor-series approximation system, a parallel array must be built with filter properties that match $G^n(j\omega)$.

The transfer function for the Taylor series approximation can be approximated using simple high pass filters.

$$H^n(j\omega) = \left(\frac{j\omega}{j\omega + A}\right)^n \approx \left(\frac{j\omega}{A}\right)^n \approx G^n(j\omega) \text{ for } j\omega \ll A.$$

As described previously, higher order filters are the result of cascading multiple filters together. Due to manufacturing variances, each stage in the physically-built cascading filter might have slight differences in its exact cutoff frequency. This variance can be modeled as by adding unique noise to the cutoff frequency at each stage of the filter:

$$H^n(j\omega) = \prod_{k=0}^{n} \frac{j\omega}{j\omega + A + \sigma_k}.$$

This results in a complex transfer function that is similar to the desired filter, $G^n(j\omega)$, but is not exact.

Therefore, a parallel array implementing a Taylor series approximation can include an increasing order of high pass filters. The first filter can be of the zeroth order and take an instantaneous measurement of the analog signal. The next filter then can be of the first order and take an instantaneous measurement of the analog signal's first time-derivative, and so on across the array. A confidence duration can be defined, where the assumed approximation of the analog input holds. Each circuit element is then coupled to an ADC 340, with the sample rate defined by this confidence window. This implementation can result in a system where all elements in the parallel array are measured at once, and the analog signal is then approximated. Once the confidence duration has elapsed, the parallel array is remeasured, and the process repeats.

Parallel Array—Spectral Sampling

Another approach to capturing the information in an analog signal is to measure the signal's frequency content. Under normal analysis, the frequency content of an analog signal is assumed to have infinite resolution. For example, the frequency content of a sine-wave is a pair of perfect delta functions. However, if the duration of the analog signal is restricted in the time domain, this frequency content begins to blur. Specifically, the perfect delta functions of the sine-wave become sinc functions. This blurring process from time-restricting the signal is identical to the smoothing effect caused by frequency-bounding the signal in standard Shannon-Nyquist sampling. Just as frequency-bounding a signal allows the continuous-time signal to be measured by a set of discrete points, time-restricting the signal allows the continuous-frequency content of the signal to be measured by a set of discrete points.

An analogy exists in applying a fast Fourier transform ("FFT") on a short sequence of recorded digital data. This finite sequence of time domain data can generate a corresponding finite sequence of frequency data (e.g., the results from the FFT).

Figure 4:
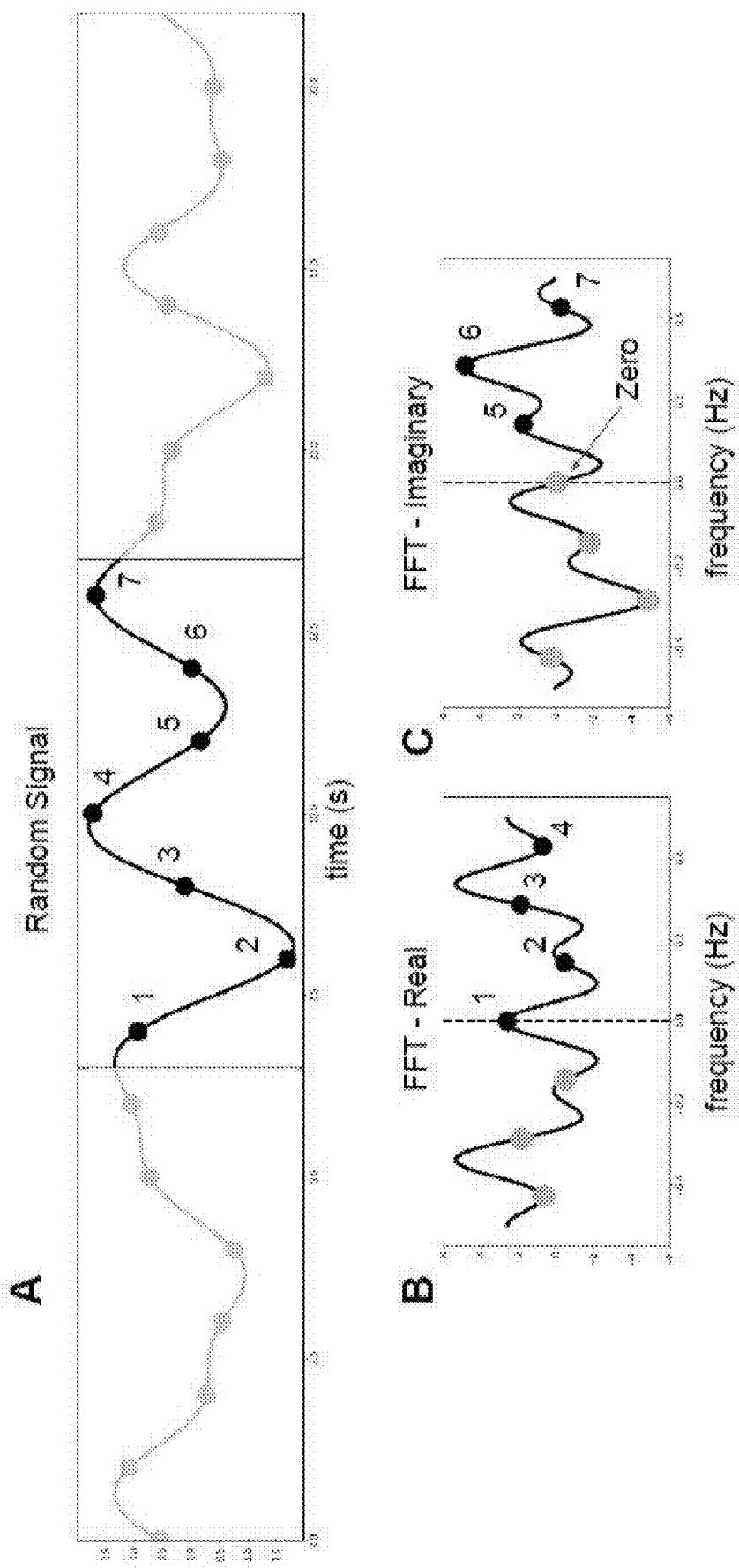
FIG. 4A shows an example random signal, with a sequence of seven points (black dots) selected.
FIG. 4B shows the real component of the fast Fourier transform of the seven selected points.
FIG. 4C shows the imaginary components of the fast Fourier transform of the seven selected points.

FIG. 4A shows an example random signal, with a sequence of seven points (black dots) selected. FIG. 4B shows the real component of the fast Fourier transform of the seven selected points. The real component contains seven points, but due to symmetry property of the real component of the Fourier transform, only four points (black dots) are unique. The black line shows the effect of the fast Fourier transform with padding. FIG. 4C shows the imaginary components of the fast Fourier transform of the seven selected points. The imaginary component contains seven points, but due to anti-symmetry property of the real component of the Fourier transform, only three points (black dots) are unique. The central point of the imaginary component is always zero. Again, the black line shows the effect of the fast Fourier transform with padding. Thus, in total, the fast Fourier transform of the sequence of points by the seven black dots is defined by seven unique points in the frequency domain.

If the original time domain data is discarded, and the inverse fast Fourier transform "iFFT" is applied to the finite frequency data, the original time domain data is recovered. This shows that a finite set of frequency measurements can capture all information about the analog input. The parallel spectral sampling approach simply skips measuring in the time domain, and instead directly measures the elements of the Fourier transform.

This measurement can be accomplished using a parallel array of spectral sampling circuits that each measure a specific frequency needed to fill out the Fourier domain of the time-bounded signal. The Fourier transform of the analog input signal must be calculated at integer multiples, 'k' of a base frequency 'ω', such that:

$$X[k] = \int_0^T x(t) \cdot e^{2\pi j k \omega_0 t} dt \text{ for } k = \{-N, \ldots, -1, 0, 1, \ldots N\}.$$

In this configuration, each spectral sampling circuit measures a pair of terms, [k] and [−k], resulting in N circuit elements. Each spectral sampling circuit includes a local oscillator, a multiplier unit, and an integrating unit. The local oscillator generates a waveform that repeats at a defined frequency. The multiplier unit multiplies the input signal with the waveform generated by this local oscillator to produce a product. The integrating unit integrates the product.

Spectral Sampling—First Implementation

In a first implementation of a spectral sampling circuit, the local oscillators generate sinusoidal waveforms, and the multiplying unit is a 4-quadrant voltage multiplier. Therefore, the two paired local oscillators, A and B, that measure the $k^{th}$ harmonic component are as follows:

$$LO_k^A(t) = \cos(2\pi k \omega_0 t).$$

$$LO_k^B(t) = \sin(2\pi k \omega_0 t).$$

Substituting Euler's formula for sinusoids, the analog voltages produced by the spectral sampling pair, $V_k^A$ and $V_k^B$, can be viewed as:

$$V_k^A = \int_0^T x(t) \cdot LO_k^A(t) dt = \int_0^T x(t) \cdot \cos(2\pi k \omega_0 t) dt =$$

$$\int_0^T x(t) \cdot \frac{1}{2}\left(e^{2\pi j k \omega_0 t} + e^{-2\pi j k \omega_0 t}\right) dt = \frac{1}{2} X[k] + \frac{1}{2} X[-k].$$

$$V_k^B = \int_0^T x(t) \cdot LO_k^B(t) dt = \int_0^T x(t) \cdot \sin(2\pi k \omega_0 t) dt =$$

$$\int_0^T x(t) \cdot \frac{1}{2j}\left(e^{2\pi j k \omega_0 t} - e^{-2\pi j k \omega_0 t}\right) dt = \frac{1}{2j} X[k] - \frac{1}{2j} X[-k].$$

To derive the desired frequency components, the samples $V_k^A$ and $V_k^B$ can be combined as follows:

$$X[k] = V_k^A + j V_k^B.$$

$$X[-k] = V_k^A - j V_k^B.$$

However, this approach is challenging to implement in circuitry. This calculation is based on perfect sine and cosine waves at specific frequencies and applying a 4-quadrant multiplication with the analog input. The circuitry to implement such a design is delicate and expensive.

Spectral Sampling—Second Implementation

To simplify this approach, in a second implementation of a spectral sampling circuit, the local oscillator generates a square wave waveform, and the multiplying unit includes an inverting amplifier and a switch. The inverting amplifier generates a negative version of the input signal, and the square wave toggles the switch to select between the negative and positive version of the input signal. This selecting is equivalent to multiplying the input signal by one or negative one. This configuration simplifies manufacturing, but requires an additional post-processing correction step. This correction step is due to the fact that a square wave signal is composed of a weighted sum of sinusoids:

$$LO_k^A(t) = \frac{\pi}{4} \text{sgn}(\cos(2\pi k \omega_0 t)) = \sum_{a=0}^{\infty} \frac{(-1)^a}{2a+1} \cos(2\pi(2a+1)k\omega_0 t).$$

$$LO_k^B(t) = \frac{\pi}{4} \text{sgn}(\sin(2\pi k \omega_0 t)) = \sum_{a=0}^{\infty} \frac{1}{2a+1} \sin(2\pi(2a+1)k\omega_0 t).$$

As a result, the analog voltages produced by the paired spectral sampling circuit measuring the $k^{th}$ harmonic, $\hat{V}_k^A$ and $\hat{V}_k^B$, contain the same spectral measurement in the first implementation of a parallel spectral sampler, $V_k^A$ and $V_k^B$, but with the addition of an error term composed of higher harmonics, $E_k^A$ and $E_k^B$.

$$\hat{V}_k^A = \int_0^T x(t) \cdot LO_k^A(t) dt = \int_0^T x(t) \cdot \sum_{a=0}^{\infty} \frac{(-1)^a}{2a+1} \cos(2\pi(2a+1)k\omega_0 t) dt =$$

$$\sum_{a=0}^{\infty} \frac{(-1)^a}{2a+1} \int_0^T x(t) \cdot \cos(2\pi(2a+1)k\omega_0 t) dt = \sum_{a=0}^{\infty} \frac{(-1)^a}{2a+1} V_{(2a+1)k}^A =$$

$$V_k^A + \sum_{a=1}^{\infty} \frac{(-1)^a}{2a+1} V_{(2a+1)k}^A = V_k^A + E^A,$$

$$E_k^A = \sum_{a=1}^{\infty} \frac{(-1)^a}{2a+1} V_{(2a+1)k}^A.$$

$$\hat{V}_k^B = \int_0^T x(t) \cdot LO_k^B(t) dt = \int_0^T x(t) \cdot \sum_{a=0}^{\infty} \frac{1}{2a+1} \sin(2\pi(2a+1)k\omega_0 t) dt =$$

$$\sum_{a=0}^{\infty} \frac{1}{2a+1} \int_0^T v(t) \cdot \sin(2\pi(2a+1)k\omega_0 t) dt = \sum_{a=0}^{\infty} \frac{1}{2a+1} V_{(2a+1)k}^B =$$

$$V_k^B + \sum_{a=1}^{\infty} \frac{1}{2a+1} V_{(2a+1)k}^B = V_k^B + E^B,$$

$$E_k^B = \sum_{a=1}^{\infty} \frac{1}{2a+1} V_{(2a+1)k}^B.$$

The correction step, described below, removes these error terms. This process is done sequentially for each spectral sampling circuit, in descending order of frequency, such that the corrected output of one spectral sampling circuit is used to correct the output of spectral sampling circuits tuned to lower frequencies.

This correction begins by recognizing that the input signal is band-limited. Thus, any harmonic component above the maximum signal frequency is zero. Therefore, the error term will be zero for any spectral sampling circuit tuned to a frequency greater than one third the maximum signal frequency.

$$V_k^A = \hat{V}_k^A, \text{ if } k\omega_0 > \frac{1}{3}W_{max}.$$

$$V_k^B = \hat{V}_k^B, \text{ if } k\omega_0 > \frac{1}{3}W_{max}.$$

For spectral sampling circuits tuned to frequencies below this threshold, the error term can be calculated and subtracted off. This correction again starts by recognizing harmonic components above the maximum signal frequency are zero, reducing the error term from an infinite sum to a finite sum.

$$V_k^A = \hat{V}_k^A - \sum_{a=1}^{M} \frac{(-1)^a}{2a+1} V_{(2a+1)k}^A.$$

$$V_k^B = \hat{V}_k^B - \sum_{a=1}^{M} \frac{1}{2a+1} V_{(2a+1)k}^B.$$

$$M = \text{floor}\left(\frac{W}{3k\omega_0}\right).$$

Since the remaining error term only contains higher harmonic components (which have already been measured and corrected), this error term can be directly calculated from the results of the higher frequency circuit elements. The corrected terms, $V_k^A$ and $V_k^B$, can then be treated exactly as the analog outputs of the first implementation of a parallel spectral sampler.

Machine Learning Error Correction

While the above analytical solution does exist, the post-processing can be handled by the machine-learning unit of the present disclosure.

In fact, it is preferable to use the machine-learning unit, because in reality it is impossible to implement a perfect square wave. For example, there will be issues with Gibbs ringing, jitter, and low pass filter effects. The resulting local oscillation will not be a perfect square wave, and thus, the analytical implementation will contain errors. These issues might become notable at high frequencies and might cause complex distortions on the resulting outputs. However, intuitively (not analytically), it is reasonable to assume the distorted local oscillator will have some unknown, consistent pattern. This unknown pattern will contain a collection of frequencies, with energy focused around the intended measurement. This collection will result in the output being the intended measurement plus some unknown error term. There should exist some formula for combining the output of each element in the array to back calculate the error terms.

Figure 5A:
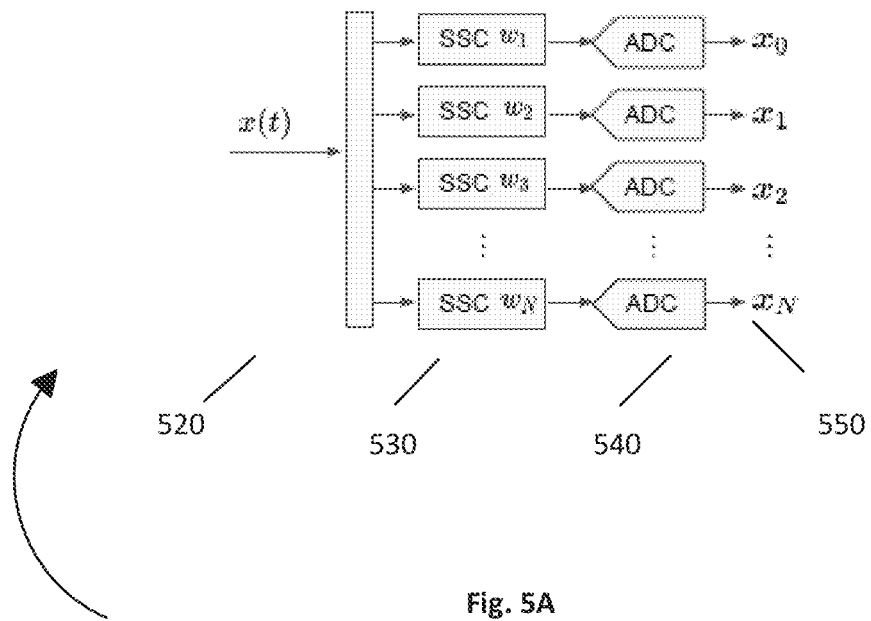
FIG. 5A illustrates a parallel array implemented with spectral sampling circuits in accordance with an implementation of the present disclosure.

Thankfully, the machine-learning approach does not require deriving any particular solution. FIG. 5A illustrates a parallel array implemented with spectral sampling circuits. The input signal is split across multiple spectral sampling circuits (A). Each element in the array is tuned to a desired frequency, wi, and the results of the circuitry can be sampled using ADC elements.

Figure 5B:
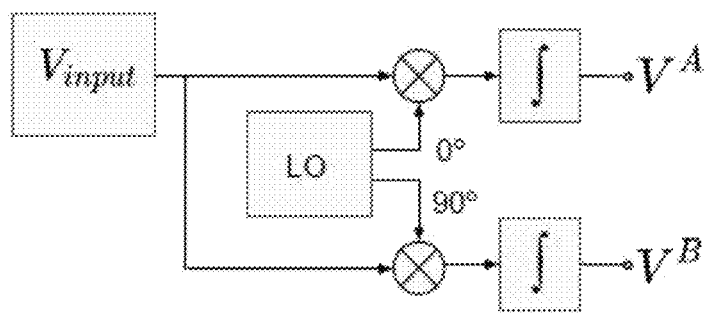
FIG. 5B illustrates a spectral sampling circuit used in FIG. 5B, according to an implementation of the present disclosure.

FIG. 5B illustrates a spectral sampling circuit. A local oscillator (LO) generates a waveform. Multipliers multiply the resulting waveform by the input signal ($V_{input}$), and the result is integrated ($V^A$). The process is repeated with the same local oscillator shifted 90 degrees out of phase to produce result $V^B$. $V^A$ and $V^B$ are then digitized separately using ADCs, and the machine learning unit receives the resulting pair of digital values as input.

The spectral sampling circuits include a collection of circuit elements that measure the magnitude and phase of individual frequencies of the analog input signal. This measurement is accomplished by generating a local oscillation, multiplying the resulting waveform with the analog input, and integrating the result. This process occurs twice for each desired frequency, with the local oscillation in the two cases being out of phase with each other.

The number of spectral sampling circuits in the array can be based on the time-window of the analog input. In the minimal case, the number of spectral sampling circuits can match (e.g., be equal to) the number of time-points to recover the analog input. These spectral sampling circuits can be tuned to frequencies uniformly distributed across the frequency space of the analog input signal. Additional spectral sampling circuits can be added to the system. This addition can cause a full retuning of the array, such that the frequency space of the input signal is sampled at a finer but uniformed resolution. Alternatively, the additional spectral sampling circuits can be biased to a certain frequency range (such as the high frequency spectrum, or around some key frequency), resulting in nonuniform distribution. Each spectral circuit element is then coupled to an ADC 540, with the sample rate, Fs, defined by the time-window, T.

$$F_s \geq \frac{1}{T}$$

The resulting system then can calculate the frequency content of a signal over the time window to produce an analog result, measure the analog results across the array, then repeat the process for the next time-window.

Parallel Array—Monte Carlo

In general, the implementations described so far involve circuit elements that include a filter combined with an ADC to digitize the result. These ADCs rely on sample-and-hold measurement devices. The machine-learning-enabled ADC allows alternatives to this design pattern.

Figure 6A:
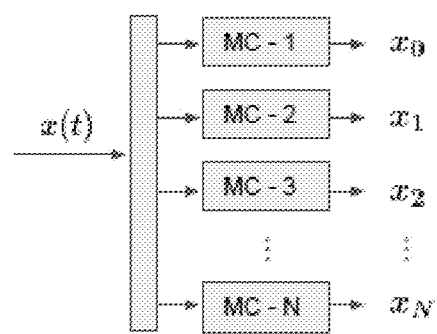
FIG. 6A illustrates a dynamic latch comparator, according to an implementation of the present disclosure.
Figure 6B:
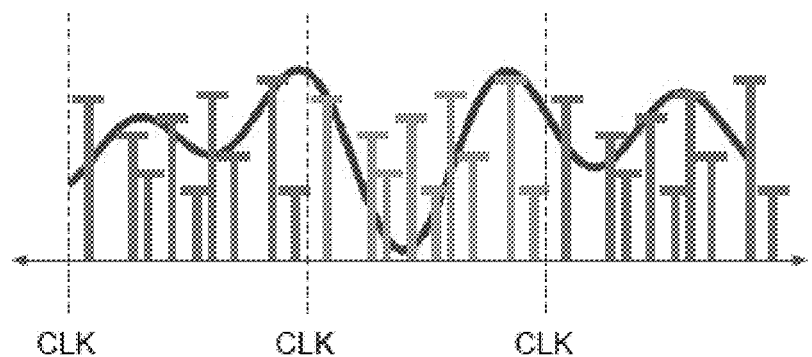
FIG. 6B illustrates an example collection of Monte Carlo elements.
Figure 6C:
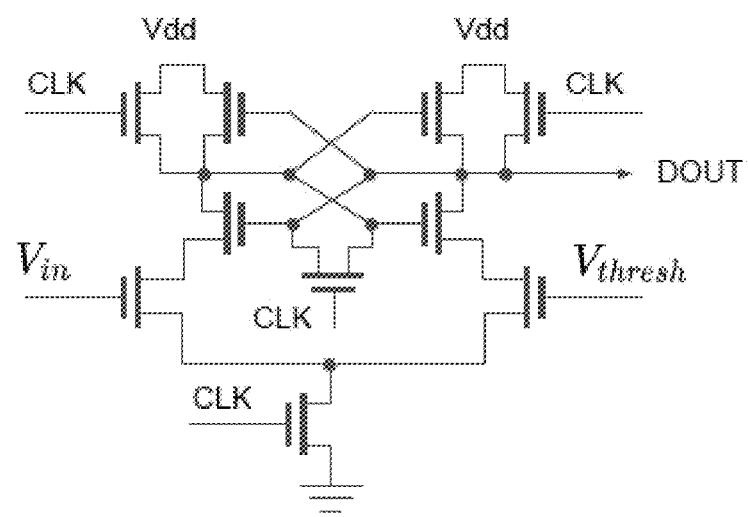
FIG. 6C illustrates a Monte Carlo parallel array, in accordance with an implementation of the present disclosure.

In the case of a Monte Carlo array, a very large number of random binary comparisons are applied to the input signal. FIG. 6A illustrates a dynamic latch comparator that compares the input signal, Vin with a reference voltage, $V_{thresh}$, at a specific time determined by the strike of a clock, CLK. This comparison results in a digital value, DOUT, that signifies if the input signal is higher than the reference voltage. FIG. 6B illustrates an example collection of Monte Carlo elements, each comparing against the input signal with a random voltage and at a random offset time. This process can repeat with different elements every clock cycle. FIG. 6C illustrates a Monte Carlo parallel array, in accordance with an implementation of the present disclosure. Each element in the array, MC, includes a digital comparator that compares the analog input signal at a specific time against a specific voltage.

As shown in FIG. 6C, these comparisons are made by comparators that can be identical to those used in Flash ADCs. However, unlike Flash ADCs, which require precise measurements to occur at precise times, the elements of the Monte Carlo array can be randomized across time and voltage, as shown in FIG. 6B. In the Monte Carlo array, each comparison occurs at an arbitrary but fixed time, and against an arbitrary but fixed voltage threshold. The timing and threshold of the comparison might or might not be known for each element. Thus, each element can report a binary result of whether the input signal exceeds the defined threshold of the element at the defined time. Each Monte Carlo element can be executed multiple times during the recording window, resulting in multiple binary comparisons from each element. In one implementation of a Monte Carlo parallel array, a very large number of these elements can be combined to capture meaningful information about the analog input signal.

Parallel Array—Mixture Array

It is not necessary for each element of the parallel array to derive from the same design theory. Prior to calibration, the machine-learning unit can be unaware of the implementation of any element, or the existence of a common design principle among the elements. Therefore, the parallel array can include elements that are mixed and matched from different theories. For example, in addition to a bandpass array, the parallel array could include an element that takes a raw instantaneous measurement of the full wideband signal at the start of the recording window. This additional measurement can serve as the initial condition to the recording window and can help the machine-learning unit form a more accurate measurement from the bandpass array.

Another more complex array can include multiple bandpass filters, a few Taylor-series circuits, and additional Monte Carlo circuits. Further, in addition to adding more independent units, design theories can be nested with the machine-learning unit. For example, the bandpass filter approach breaks the input signal into frequency bands, which then can be sampled by ADC elements. The frequency band can be sampled instead by Taylor series elements. Thus, in this example, for each of the 'N' frequency bands, there are 'M' Taylor series elements, resulting in 'N×M' total sampling elements. This also can be flipped, where each Taylor series element is measured using the bandpass filter technique, and so on. As long as the information contained in the analog signal is captured by the elements in the parallel array, then the hard work of sorting it out is offloaded to the machine learning unit.

Machine Learning Unit

The machine learning unit includes circuitry that maps digital features generated by the parallel array into a digital representation of the analog input signal.

$$<Y_1, Y_2, \ldots, Y_M> = f(X_1, X_2, \ldots, X_N).$$

This mapping is defined by a set of parameters that are specific to an implementation of the machine-learning unit, such as the weights in a neural network. The exact mathematical nature of the mapping between the input and the output is determined through a calibration procedure. In the calibration procedure, the machine-learning unit is provided with example digital inputs and their desired digital outputs. During calibration, the parameters are adjusted through optimization techniques, such as back propagation and stochastic gradient descent (SGD), until the machine-learning unit produces the desired output within an acceptable tolerance. This calibration procedure can occur before manufacturing, using numerical simulation, and/or after manufacturing, on test devices. In some implementations, active learning, which is a slow and power intensive process, occurs on the device. In other implementations, after a successful calibration, the parameters can be hard coded (which can be updated through firmware) or hardwired (which is permanent), and the machine-learning unit can process data from the parallel array in inference mode, without any further learning.

The machine-learning unit can be implemented 1) in software, 2) using a field programmable gate array (FPGA), or 3) implemented as an application specific integrated circuit (ASIC). The choice in implementation depends on a tradeoff between flexibility and performance, with software typically having the most flexibility and an ASIC typically having the best performance.

Machine Learning Unit—Feedforward Neural Network

Figure 7A:
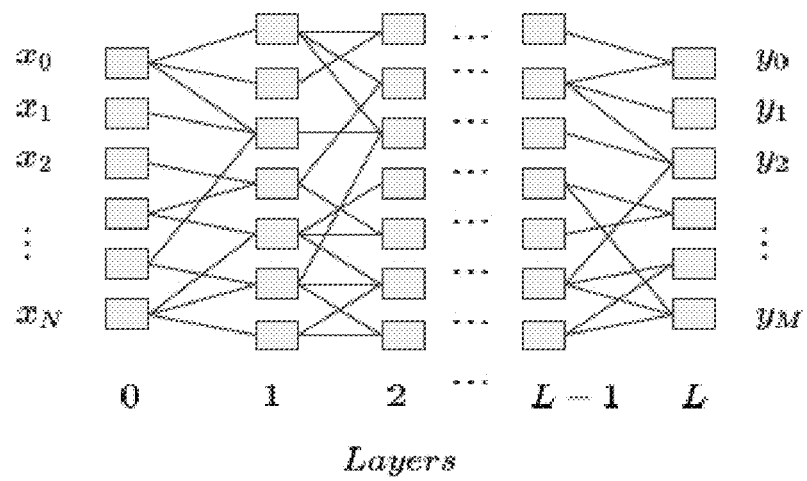
FIG. 7A illustrates an implementation of the machine-learning unit as a neural network, according to an implementation of the present disclosure.
Figure 7B:
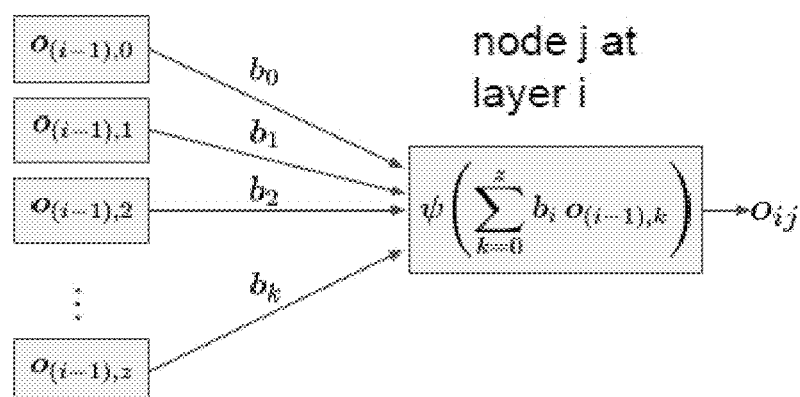
FIG. 7B shows the output of a specific node at a specific layer, according to an implementation of the present disclosure.

FIG. 7A illustrates an implementation of the machine-learning unit as a neural network, according to an implementation of the present disclosure. The input feature set (x) is fed into the network, which includes multiple layers of nodes that form weighted connections between each other in the subsequent layers. This finally results in the output, (y). FIG. 7B shows how the output of a specific node at a specific layer is the result of an activation function, q, applied to a weighted sum of the output of the nodes in the previous layer.

This approach involves a collection of nodes that form weighted connections with each other, arranged in sequential layers. The input layer of the network is connected to the digital features generated by the parallel array. As shown in FIG. 7B, the output of each node (oj) in the input layer combines the digital features using a weighted sum. The node then applies an activation function ($\varphi$), such as rectified linear unit, hyperbolic tangent, or sigmoid, to the resulting sum.

$$o_j = \varphi\left(\sum_{k=1}^{n} w_{kj} \cdot x_k\right).$$

The exact weighting at each node is calculated during the calibration procedure, and the activation function can be selected based on various criteria. The output of this first layer is then connected in the same manner to a hidden layer, and the process is repeated. The number of hidden layers and the number of nodes in each layer can be based on various criteria. At the final stage, the final hidden layer is connected to the output of the neural network. The output layer applies the same weighted sum and activation process, and the output of each final node is a digital number that represents a sample of the original analog signal. The values from this output layer are then routed out of the device as the overall output of the machine-learning-enabled ADC.

Machine Learning Unit—Recurrent Neural Network

In standard neural network design, the nodes in the network form a set of sequential layers. As a result, there are no loops in the system, such that the output of one node is never fed backwards to a lower layer. There is a class of neural networks that do allow these loops to occur, called recurrent neural networks (RNN). These networks apply similar techniques as the standard neural networks for optimizing and processing data. The key advantage is that recurrent loops allow the network to maintain a form of memory, which can affect future results. One could think of a standard neural network as applying a finite response filter (FIR) and the recurrent neural network as applying an infinite response filter (IIR). Thus, select implementations include an RNN when applying a filter to the expected digital output or when using a collection of non-time-invariant elements in the parallel array.

Figure 8:
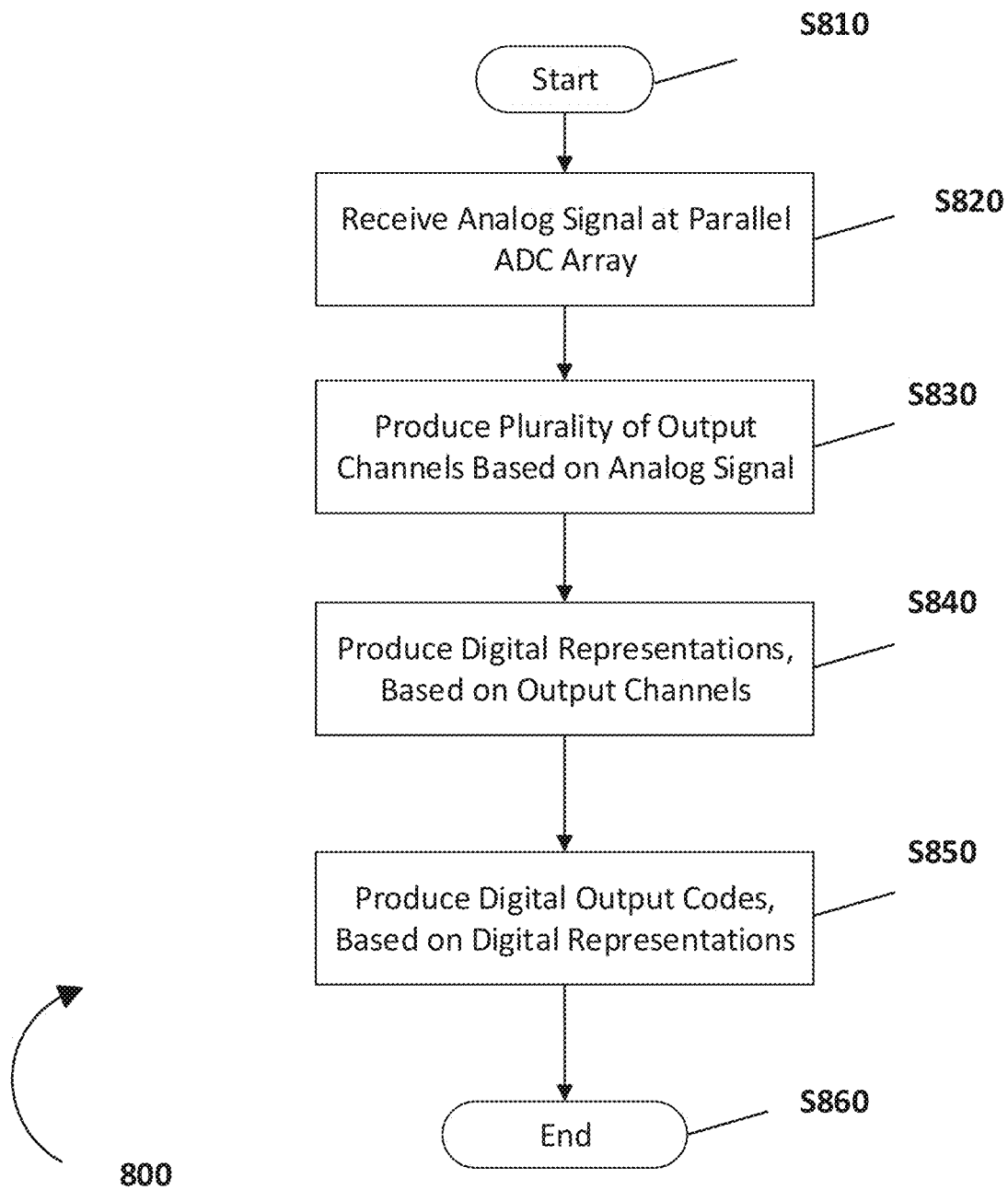
FIG. 8 illustrates an algorithm performed by various implementations of the present disclosure.

FIG. 8 illustrates an algorithm 800 performed by various implementations of the present disclosure. Prior to executing the algorithm, the machine-learning unit should converge on an appropriate input-output solution, as discussed in more detail in U.S. patent application Ser. No. 18/238,430 (issued U.S. Pat. No. 12,301,243), incorporated herein by reference in its entirety.

The algorithm 800 starts at S810, and the algorithm 800 advances to S820.

In S820, the machine-learning-enabled ADC receives an analog input signal at a parallel ADC array, as illustrated in FIGS. 1-3, 5A, and 6A, for example. The algorithm 800 then advances to S830.

In S830, a signal routing unit produces a plurality of analog signal channels, each based at least in part on the analog input. This routing can be performed using a layered tree structure of buffer-and-split circuits as illustrated later. Then, the algorithm 800 advances to S840.

In S840, the parallel array produces digital representations, based on the split outputs. In many implementations, these digital representations are produced by ADCs within the parallel array. The algorithm 800 then advances to S850.

In S850, the machine-learning unit produces digital output codes, based on the digital representations. The algorithm 800 then advances to S860 and concludes.

The machine learning algorithm is not limited to being a neural network. Other implementations include support vector machine (SVM), ridge regression, hidden Markov models, clustering algorithms, and a naive Bayes classifier.

Figure 9:
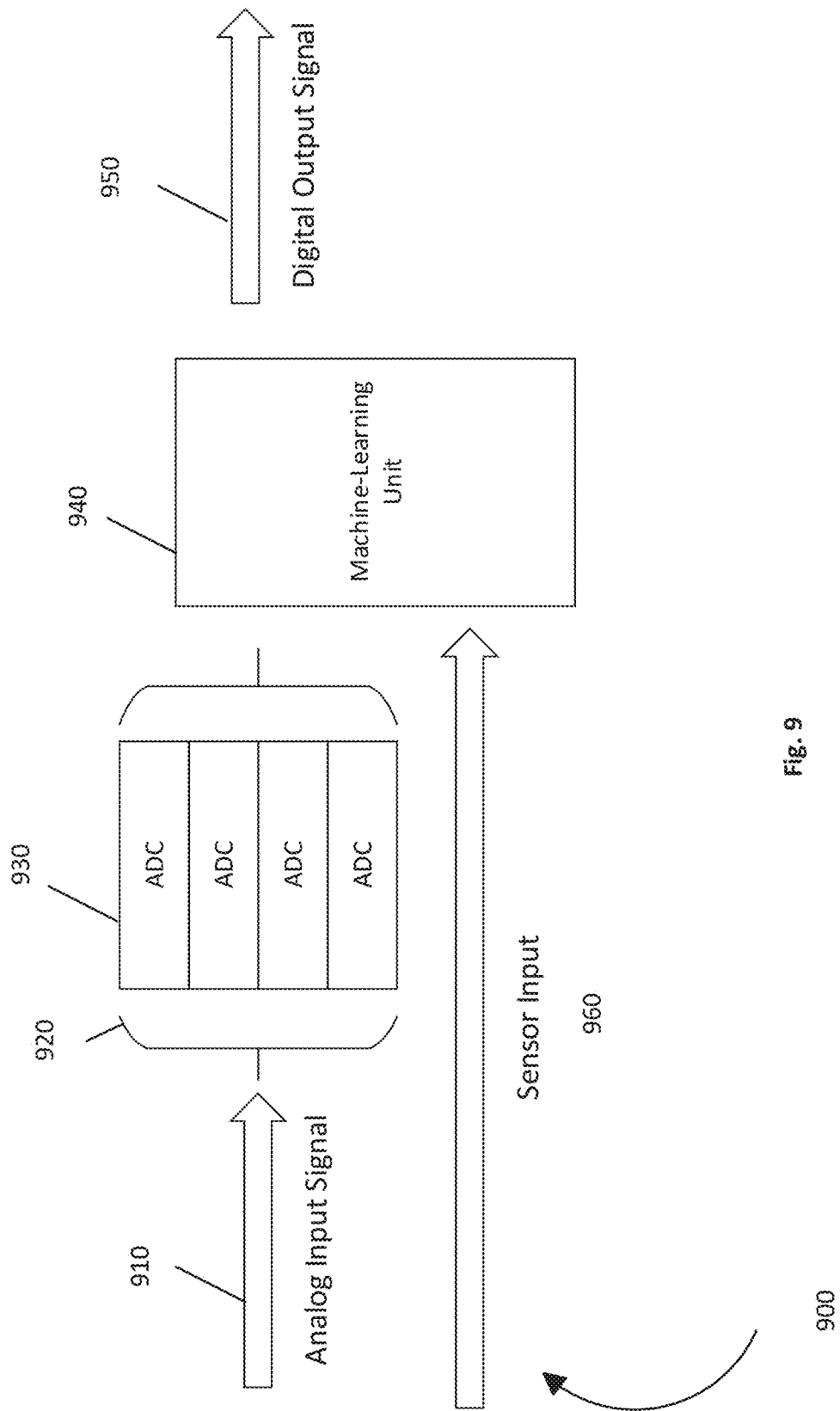
FIG. 9 illustrates a layout for implementations including a sensor input, according to various implementations of the present disclosure.

FIG. 9 illustrates a layout for implementations including a sensor input, according to various implementations of the present disclosure. As illustrated in FIG. 9, the machine-learning unit 940 receives a sensor input 960 in addition to the split outputs of the analog input signal 910. The sensor input 960 can be received from external sensors to monitor performance of the device.

External environments can impact the performance of the machine-learning-enabled ADC device. Environmental examples can include increased temperatures, vacuum pressures, humidity, physical strain, and strong magnetic fields. The data collection phase can be adjusted to account for external environmental conditions. For example, the numerical simulations of the parallel array can be performed in multiphysics simulators that incorporate the environmental conditions.

If test devices are manufactured, then the physical test devices can be placed into test rigs that are exposed to the environmental conditions. The data generated during environmental conditioning can be used for optimization.

Figure 10B:
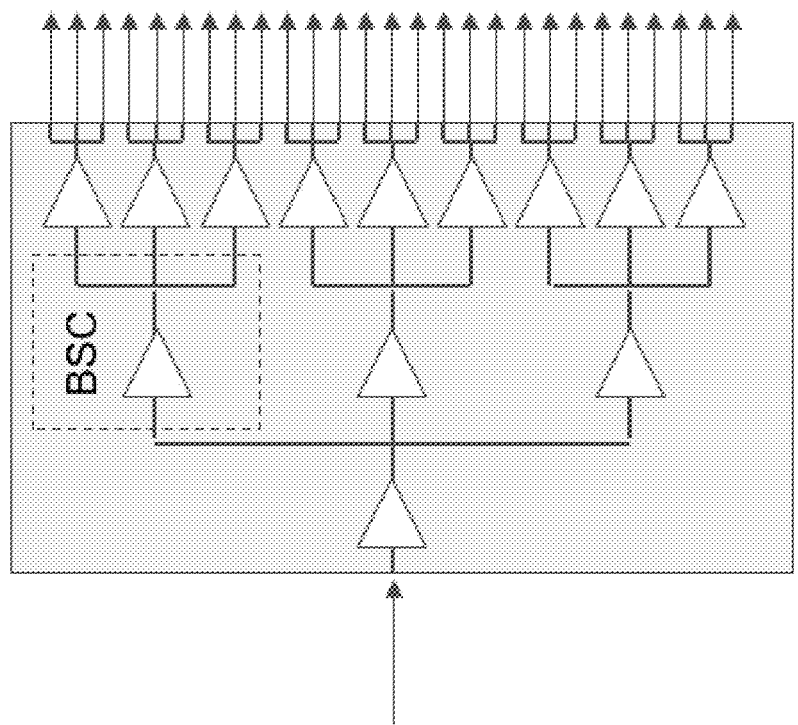
FIGS. 10A-B illustrate examples of a signal routing unit, according to various implementations of the present disclosure.
Figure 10A:
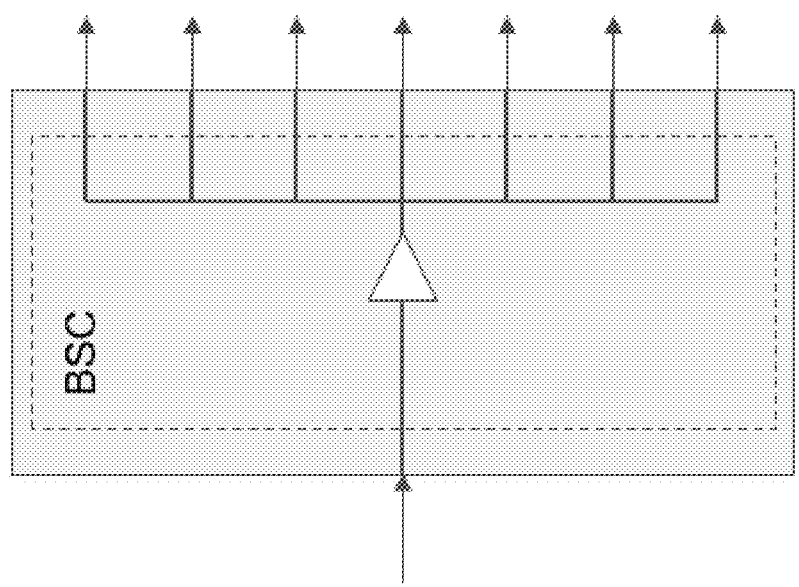

FIGS. 10A-10B illustrates examples of a signal routing unit, according to various implementations of the present disclosure. The signal routing unit can be included in the implementations illustrated in FIGS. 1-3, 5A, and 6A, for example. The signal routing unit illustrates a one-layer tree structure of buffer-and-split circuits, and a three-layer tree structure of buffer-and-split circuits. Of course, other implementations are possible.

In a configuration illustrated in FIG. 10A, the tree is built with one layer. In this case, the single BSC acts as a buffer amplifier and directly routes its output to each analog signal in the plurality of outputs.

In the multilayer case illustrated in FIG. 10B, the output of each BSC branches out to the next layer in the tree, which terminates at the final layer as the analog signals in the plurality of outputs.

Figure 11:
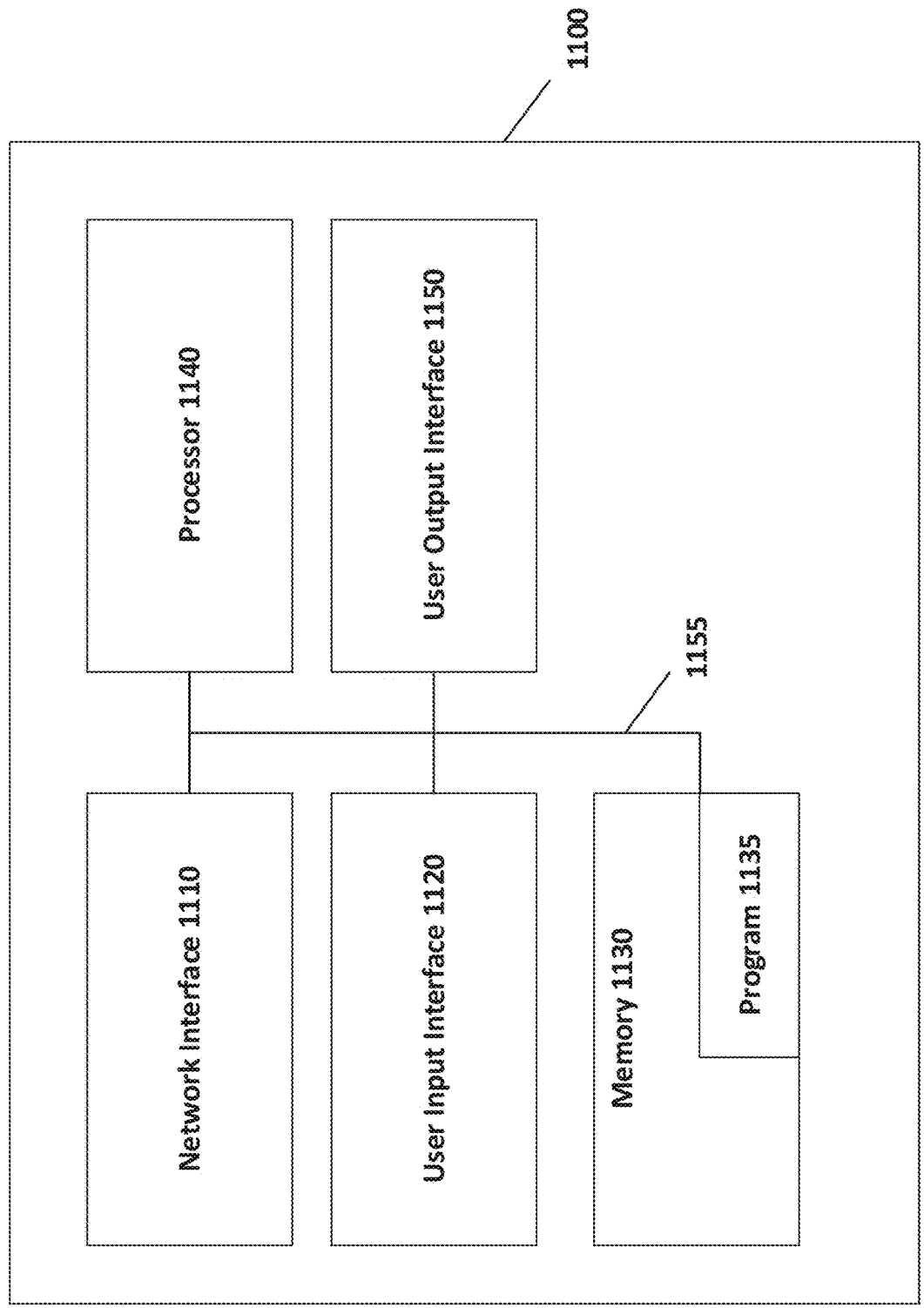
FIG. 11 illustrates a computing device, according to an implementation of the present disclosure.

FIG. 11 illustrates a computing device 1100, according to an implementation of the present disclosure. The machine learning unit 140 can be partially or entirely implemented by the computing device 1100.

The computing device 1100 can include a network interface 1110, a user input interface 1120, a memory 1130, a program 135, a processor 1140, a user output interface 1150, and a bus 1155.

Although illustrated within a single housing, the computing device 1100 can be distributed across plural housings or sub-systems that cooperate in executing program instructions. In some implementations, the computing device 1100 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows OS, macOS, or Linux in many implementations, the system hardware can be configured according to a Symmetric Multi-Processing (SMP) architecture or a Non-Uniform Memory Access (NUMA) architecture.

The network interface 1110 provides one or more communication connections and/or one or more devices that allow for communication between the computing device 1100 and other computing systems (not shown) over a communication network, collection of networks (not shown), or the air, to support the machine learning-enabled analog-to-digital converter, outlined herein. The network interface 1110 can communicate using various networks (including both internal and external networks), such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 1120 can receive one or more inputs from a human. The user input interface 1120 can be or include a mouse, a touchpad, a keyboard, a touchscreen, a trackball, a camera, a microphone, a joystick, a game controller, a scanner, or any other input device.

The memory 1130, also termed a "storage," can include or be one or more computer-readable storage media readable by the processor 1140 and that store software. The memory 1130 can be implemented as one storage device or across multiple co-located or distributed storage devices or sub-systems. The memory 1130 can include additional elements, such as a controller, that communicate with the processor 1140. The memory 1130 can also include storage devices and/or sub-systems on which data and/or instructions are stored. The computing device 1100 can access one or more storage resources to access information to carry out any of the processes indicated in this disclosure and, in particular, FIG. 8. In various implementations, the memory 1130 stores the program 1135 to execute at least a portion of the algorithms illustrated in FIG. 8. Further, the program 1135, when executed by the computing device 1100 generally and/or the processor 1140 specifically, can direct, among other functions, performance of the operations of the machine learning-enabled analog-to-digital converter, as described herein.

The memory 1130 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 1130 can be or include resistive RAM (RRAM) or a magneto-resistive RAM (MRAM). The information being tracked, sent, received, or stored in a communication system can be provided in any database, register, table, cache, queue, control list, or storage structure, based on particular implementations, all of which could be referenced in any suitable timeframe.

The processor 1140 (e.g., a processing unit) can be or include one or more hardware processors and/or other circuitry that retrieve and execute software, especially the program 1130, from the memory 1130. The processor 1140 can be implemented within one processing device, chip, or package and can also be distributed across multiple processing devices, chips, packages, or sub-systems that cooperate. In some implementations, the processor 1140 is or includes a Graphics Processing Unit (GPU).

The processor 1140 can have any register size, such as a 32-bit register or a 64-bit register, among others. The processor 1140 can include multiple cores. Implementations of the processor 1140 are not limited to any particular number of threads. The processor 1140 can be fabricated by any process technology, such as 14 nm process technology.

The user output interface 1150 outputs information to a human user. The user output interface 1150 can be or include a display (e.g., a screen), a touchscreen, speakers, a printer, or a haptic feedback unit. In many implementations, the user output interface 1150 can be combined with the user input interface 1120. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the machine learning-enabled analog-to-digital converter, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media). Accordingly, aspects of the present disclosure can take the form of a hardware implementation, a software implementation (including firmware, resident software, or microcode) or an implementation combining software and hardware aspects that can generally be referred to herein as a "module" or a "system." Functions described in this disclosure can be implemented as an algorithm executed by one or more hardware processing units, e.g., the processor 1140. In various embodiments, different operations and portions of the operations of the algorithms described can be performed by different processing units. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 1155 can share hardware resources with the memory 1130 and the processor 1140. In this alternative implementation, the computing device 1100 can be provided with separate hardware resources including one or more processors and memory elements.

In example implementations, various other components of the computing device 1100 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 1155. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

Modifications

This disclosure is amenable to multiple concrete implementations (i.e., transistor layouts on silicon chips).

EXAMPLES

In Example A1, a machine-learning-enabled analog-to-digital converter includes a parallel analog-to-digital converter array (PA ADC) that receives an analog signal and including a signal routing unit that produces a plurality of analog channels, each analog channel of the plurality of analog channels based at least in part on the analog input signal; and a parallel array of comparators, each comparator of the parallel array of comparators to produce a respective digital representation, at least in part based on the respective analog channel from one of the plurality of channels; and a machine-learning unit including a machine learning algorithm configured to produce digital output codes that represent the analog signal, at least in part based on the respective digital representations from the parallel array of comparators.

Example A2 is the analog-to-digital converter of Example A1, wherein the parallel array of comparators includes a plurality of bandpass filter circuits, each bandpass filter circuit of the plurality of bandpass filtered circuits configured to produce a filtered signal, at least in part by passing a portion of the analog channel in a frequency band centered on a predetermined frequency for the respective channel, the digital representation of the analog signal is produced, at least in part based on the respective filtered signal, and the plurality of bandpass filter circuits includes at least one of a low pass filter or a high pass filter.

Example A3 is the analog-to-digital converter of any of Examples A1-A2, wherein the signal routing unit includes a layered tree structure of buffer-and-split circuits, in which each of the buffer-and-split circuits produces an output, the respective output at least in part based on the analog input signal, and each of the buffer-and-split circuits buffers the respective output.

Example A4 is the analog-to-digital converter of any of Examples A1-A3, wherein the comparators are one-bit analog-to-digital converters (ADCs) configured to produce the respective digital representation, at least in part based on a comparison of the respective analog channel against a predetermined reference voltage at a trigger time.

Example A5 is the analog-to-digital converter of any of Examples A1-A4, wherein the parallel array of comparators includes a plurality of high-pass filter circuits (HPFCs), each HPFC of the HPFCs including a respective high-pass filter of order K, where K is a positive integer specific to the respective channel, the respective high-pass filter to produce a filtered signal, at least in part based on the respective analog channel, and the digital representation of the analog signal is produced, at least in part based on the respective filtered signal.

Example A6 is the analog-to-digital converter of any of Examples A1-A5, wherein the parallel array includes a first spectral sampling circuit (SSC) and a second SSC, the second SSC $\pi/2$ out of phase with the first SSC, each SSC comprising a waveform generator that produces a local waveform, a multiplier that multiplies the respective analog channel against the local waveform to produce a product, and an integrating unit that integrates the product over a time interval to produce an integrated analog output; and a plurality of quantizers, each quantizer of the plurality of quantizers configured to convert the respective integrated analog output into the digital representation of the analog signal.

Example A7 is the analog-to-digital converter of any of Examples A1-A6, wherein the machine-learning unit limits an error between the digital output codes and expected Shannon-Nyquist samples of the analog input signal to within a bit-resolution or code error rate of the machine-learning-enabled analog-to-digital converter.

In Example M1, a method is to be implemented by a machine-learning-enabled analog-to-digital converter and includes receiving an analog signal at a parallel analog-to-digital converter array (PA ADC); generating, with a signal routing unit, a plurality of analog channels, each analog channel of the plurality of analog channels based at least in part on the analog signal; producing, with a respective comparator of a parallel array of comparators, a respective digital representation, at least in part based on a respective channel of the plurality of channels; and producing digital output codes that represent the analog signal, at least in part based on the respective digital representations from the parallel array of comparators.

Example M2 is the method of Example M1, further comprising: producing, by each bandpass filter circuit of a plurality of bandpass filter circuits, a filtered signal, at least in part by passing a portion of the analog channel in a frequency band centered on a predetermined frequency for a respective analog channel, wherein the digital representation of the analog signal is produced, at least in part based on the respective filtered signal, and the plurality of bandpass filter circuits includes at least one of a low pass filter or a high pass filter.

Example M3 is the method of any of Examples M1-M2, further comprising: producing, by each buffer-and-split circuit of a layered tree structure of buffer-and-split circuits, an output, at least in part based on the analog input signal, wherein each of the buffer-and-split circuits buffers the respective output.

Example M4 is the method of any of Examples M1-M3, wherein the comparators are one-bit analog-to-digital converters (ADCs), and the respective digital representation is produced, at least in part based on a comparison of the respective analog channel against a predetermined reference voltage at a trigger time.

Example M5 is the method of any of Examples M1-M4, further comprising: producing a filtered signal by a respective high-pass filter of a plurality of high-pass filter circuits (HPFCs), at least in part based on the respective analog channel, each HPFC of the HPFCs including a respective high-pass filter of order K, where K is a positive integer specific to the respective channel, wherein the digital representation of the analog signal is produced, at least in part based on the respective filtered signal.

Example M6 is the method of any of Examples M1-M5, further comprising: producing a local waveform by a waveform generator of a first spectral sampling circuit (SSC) and a waveform generator of a second SSC, the second SSC $\pi/2$ out of phase with the first SSC, multiplying, by a multiplier of the first SSC and a multiplier of the second SSC, the respective analog channel against the respective local waveform to produce a product; integrating, by an integrating unit of the first SSC and an integrating unit of the second SSC, the respective product over a time interval to produce an integrated analog output; and converting, by a plurality of quantizers, the respective integrated analog output into the digital representation of the analog signal.

Example M7 is the method of any of Examples M1-M6, wherein an error between the digital output codes and expected Shannon-Nyquist samples of the analog input signal are limited to within a bit-resolution or code error rate of the machine-learning-enabled analog-to-digital converter.

In Example F1, a machine-learning-enabled analog-to-digital converter, includes signal-routing means for producing a plurality of analog channels, each analog channel of the plurality of analog channels based at least in part on an analog input signal; digital-representation-production means for producing a respective digital representation, at least in part based on the respective analog channel from one of the plurality of channels; and digital-output-production means for producing digital output codes that represent the analog signal, at least in part based on the respective digital representations.

Example F2 is the analog-to-digital converter of Example F1, wherein the digital-representation-production means includes means for producing a filtered signal, at least in part by passing a portion of the analog channel in a frequency band centered on a predetermined frequency for the respective channel, and the digital representation of the analog signal is produced, at least in part based on the respective filtered signal.

Example F3 is the analog-to-digital converter of any of Examples F1-F2, wherein the signal-routing means includes buffering means for producing an output, at least in part based on the analog input signal, and the buffering means buffers the output.

Example F4 is the analog-to-digital converter of any of Examples F1-F3, wherein the digital-representation-production means produce the respective digital representation, at least in part based on a comparison of the respective analog channel against a predetermined reference voltage at a trigger time.

Example F5 is the analog-to-digital converter of any of Examples F1-F4, wherein the digital-representation-production means produces a filtered signal, at least in part based on the respective analog channel, and the digital representation of the analog signal is produced, at least in part based on the respective filtered signal.

Example F6 is the analog-to-digital converter of any of Examples F1-F5, further comprising: first and second spectral-sampling means for producing a local waveform, for multiplying the respective analog channel against the local waveform to produce a product, and for integrating the product over a time interval to produce an integrated analog output, the second spectral-sampling means $\pi/2$ out of phase with the first spectral-sampling means; and quantization means for converting the respective integrated analog output into the digital representation of the analog signal.

Example F7 is the analog-to-digital converter of any of Examples F1-F6, wherein the digital-output-production means limits an error between the digital output codes and expected Shannon-Nyquist samples of the analog input signal to within a bit-resolution or code error rate of the machine-learning-enabled analog-to-digital converter.

I claim:

1. A machine-learning-enabled analog-to-digital converter, comprising:
    a parallel analog-to-digital converter array (PA ADC) that receives an analog signal and including
        a signal routing unit that produces a plurality of analog channels, each analog channel of the plurality of analog channels based at least in part on the analog input signal; and
        a parallel array of comparators, each comparator of the parallel array of comparators to produce a respective digital representation, at least in part based on the respective analog channel from one of the plurality of channels; and
    a machine-learning unit including a machine learning algorithm that has inferred through observation a mapping between a training plurality of digital representations that represents a training analog signal and a training digital output code that represents the training analog signal, wherein the machine-learning unit receives the digital representations from the parallel analog-to-digital converter array as an input to the machine-learning algorithm to produce digital output codes that represent the analog input signal.

2. The analog-to-digital converter of claim 1, wherein the parallel array of comparators includes
    a plurality of bandpass filter circuits, each bandpass filter circuit of the plurality of bandpass filtered circuits configured to produce a filtered signal, at least in part by passing a portion of the analog channel in a frequency band centered on a predetermined frequency for the respective channel,
    the digital representation of the analog input signal is produced, at least in part based on the respective filtered signal, and
    the plurality of bandpass filter circuits includes at least one of a low pass filter or a high pass filter.

3. The analog-to-digital converter of claim 1, wherein the signal routing unit includes
    a layered tree structure of buffer-and-split circuits, in which each of the buffer-and-split circuits produces an output, the respective output at least in part based on the analog input signal, and each of the buffer-and-split circuits buffers the respective output.

4. The analog-to-digital converter of claim 1, wherein the comparators are one-bit analog-to-digital converters (ADCs) configured to produce the respective digital representation, at least in part based on a comparison of the respective analog channel against a predetermined reference voltage at a trigger time.

5. The analog-to-digital converter of claim 1, wherein the parallel array of comparators includes
    a plurality of high-pass filter circuits (HPFCs), each HPFC of the HPFCs including a respective high-pass filter of order K, where K is a positive integer specific to the respective channel, the respective high-pass filter to produce a filtered signal, at least in part based on the respective analog channel, and
    the digital representation of the analog input signal is produced, at least in part based on the respective filtered signal.

6. The analog-to-digital converter of claim 1, wherein the parallel array includes
    a first spectral sampling circuit (SSC) and a second SSC, the second SSC $\pi/2$ out of phase with the first SSC, each SSC comprising
        a waveform generator that produces a local waveform,
        a multiplier that multiplies the respective analog channel against the local waveform to produce a product, and
        an integrating unit that integrates the product over a time interval to produce an integrated analog output; and
    a plurality of quantizers, each quantizer of the plurality of quantizers configured to convert the respective integrated analog output into the digital representation of the analog input signal.

7. The analog-to-digital converter of claim 1, wherein the machine-learning unit limits an error between the digital output codes and expected Shannon-Nyquist samples of the analog input signal to within a bit-resolution or code error rate of the machine-learning-enabled analog-to-digital converter.

8. A method to be implemented by a machine-learning-enabled analog-to-digital converter, the method comprising:
    receiving an analog input signal at a parallel analog-to-digital converter array (PA ADC);
    generating, with a signal routing unit, a plurality of analog channels, each analog channel of the plurality of analog channels based at least in part on the analog input signal;
    producing, with a respective comparator of a parallel array of comparators, a respective digital representation, at least in part based on a respective channel of the plurality of channels;
    receiving the digital representations from the parallel array of comparators as an input to a machine-learning algorithm that has inferred through observation a mapping between a training plurality of digital representations that represents a training analog signal and a training digital output code that represents the training analog signal; and
    producing, by the machine-learning algorithm, digital output codes that represent the analog input signal, at least in part based on the input.

9. The method of claim 8, further comprising:
    producing, by each bandpass filter circuit of a plurality of bandpass filter circuits, a filtered signal, at least in part by passing a portion of the analog channel in a frequency band centered on a predetermined frequency for a respective analog channel, wherein
    the digital representation of the analog input signal is produced, at least in part based on the respective filtered signal, and
    the plurality of bandpass filter circuits includes at least one of a low pass filter or a high pass filter.

10. The method of claim 8, further comprising:
producing, by each buffer-and-split circuit of a layered tree structure of buffer-and-split circuits, an output, at least in part based on the analog input signal, wherein each of the buffer-and-split circuits buffers the respective output.

11. The method of claim 8, wherein the comparators are one-bit analog-to-digital converters (ADCs), and the respective digital representation is produced, at least in part based on a comparison of the respective analog channel against a predetermined reference voltage at a trigger time.

12. The method of claim 8, further comprising:
producing a filtered signal by a respective high-pass filter of a plurality of high-pass filter circuits (HPFCs), at least in part based on the respective analog channel, each HPFC of the HPFCs including a respective high-pass filter of order K, where K is a positive integer specific to the respective channel, wherein
the digital representation of the analog input signal is produced, at least in part based on the respective filtered signal.

13. The method of claim 8, further comprising:
producing a local waveform by a waveform generator of a first spectral sampling circuit (SSC) and a waveform generator of a second SSC, the second SSC $\pi/2$ out of phase with the first SSC,
multiplying, by a multiplier of the first SSC and a multiplier of the second SSC, the respective analog channel against the respective local waveform to produce a product;
integrating, by an integrating unit of the first SSC and an integrating unit of the second SSC, the respective product over a time interval to produce an integrated analog output; and
converting, by a plurality of quantizers, the respective integrated analog output into the digital representation of the analog input signal.

14. A machine-learning-enabled analog-to-digital converter, comprising:
signal-routing means for producing a plurality of analog channels, each analog channel of the plurality of analog channels based at least in part on an analog input signal;
digital-representation-production means for producing a respective digital representation, at least in part based on the respective analog channel from one of the plurality of channels; and
digital-output-production means that receive, as an input, the digital representations from the digital-representation-production means and for producing digital output codes that represent the analog input signal, at least in part based on the input.

15. The analog-to-digital converter of claim 14, wherein the digital-representation-production means includes means for producing a filtered signal, at least in part by passing a portion of the analog channel in a frequency band centered on a predetermined frequency for the respective channel, and
the digital representation of the analog input signal is produced, at least in part based on the respective filtered signal.

16. The analog-to-digital converter of claim 14, wherein the signal-routing means includes buffering means for producing an output, at least in part based on the analog input signal, and the buffering means buffers the output.

17. The analog-to-digital converter of claim 14, wherein the digital-representation-production means produce the respective digital representation, at least in part based on a comparison of the respective analog channel against a predetermined reference voltage at a trigger time.

18. The analog-to-digital converter of claim 14, wherein the digital-representation-production means produces a filtered signal, at least in part based on the respective analog channel, and
the digital representation of the analog input signal is produced, at least in part based on the respective filtered signal.

19. The analog-to-digital converter of claim 14, further comprising:
first and second spectral-sampling means for producing a local waveform, for multiplying the respective analog channel against the local waveform to produce a product, and for integrating the product over a time interval to produce an integrated analog output, the second spectral-sampling means $\pi/2$ out of phase with the first spectral-sampling means; and
quantization means for converting the respective integrated analog output into the digital representation of the analog input signal.

20. The analog-to-digital converter of claim 14, wherein the digital-output-production means limits an error between the digital output codes and expected Shannon-Nyquist samples of the analog input signal to within a bit-resolution or code error rate of the machine-learning-enabled analog-to-digital converter.

* * * * *